United States Patent
Kawai

(10) Patent No.: US 8,081,220 B2
(45) Date of Patent: Dec. 20, 2011

(54) DIGITAL STILL CAMERA AND METHOD OF CONTROLLING IMAGE COMBINATION

(75) Inventor: Tomoyuki Kawai, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 600 days.

(21) Appl. No.: 12/167,019

(22) Filed: Jul. 2, 2008

(65) Prior Publication Data

US 2009/0009614 A1     Jan. 8, 2009

(30) Foreign Application Priority Data

Jul. 3, 2007  (JP) ................................. 2007-174891

(51) Int. Cl.
*H04N 5/228* (2006.01)

(52) U.S. Cl. ............ 348/208.12; 348/208.1; 348/333.01; 348/222.1

(58) Field of Classification Search ............. 348/208.12, 348/333.01, 208.1
See application file for complete search history.

(56) References Cited

U.S. PATENT DOCUMENTS

| | | | |
|---|---|---|---|
| 5,121,317 A | 6/1992 | Vogler et al. | |
| 7,433,589 B2 * | 10/2008 | Odaka | 396/155 |
| 7,667,744 B2 * | 2/2010 | Iijima | 348/239 |
| 7,756,411 B2 * | 7/2010 | Tanaka et al. | 396/155 |
| 2002/0097324 A1 * | 7/2002 | Onuki | 348/208 |
| 2004/0239779 A1 | 12/2004 | Washisu | |
| 2005/0231631 A1 | 10/2005 | Miyazaki | |
| 2006/0045510 A1 * | 3/2006 | Odaka | 396/155 |
| 2008/0136939 A1 | 6/2008 | Tamamura | |
| 2009/0128650 A1 * | 5/2009 | Takahashi et al. | 348/222.1 |
| 2010/0118152 A1 * | 5/2010 | Nitta | 348/207.1 |

FOREIGN PATENT DOCUMENTS

| | | | |
|---|---|---|---|
| JP | 5-14801 A | | 1/1993 |
| JP | 6-70212 A | | 3/1994 |
| JP | 9-261526 A | | 10/1997 |
| JP | 11-136557 A | | 5/1999 |
| JP | 11-196321 A | | 7/1999 |
| JP | 11-252445 A | | 9/1999 |
| JP | 2000-152097 A | | 5/2000 |
| JP | 3110797 B2 | | 9/2000 |
| JP | 2001-86395 A | | 3/2001 |
| JP | 2002-190980 A | | 7/2002 |
| JP | 2003-32540 A | | 1/2003 |

(Continued)

*Primary Examiner* — Jason Chan
*Assistant Examiner* — Cynthia Calderon
(74) *Attorney, Agent, or Firm* — Birch, Stewart, Kolasch & Birch, LLP

(57) ABSTRACT

A solid-state electronic image sensing device senses the image of a subject repeatedly for an exposure time over which camera shake is thought not to occur, and repeatedly outputs image data representing the image of the subject. A combining device generates one frame of a combined image obtained by combining the image of the subject represented by image data that has been output from the solid-state electronic image sensing device with the image of the subject represented by image data that was output from the solid-state electronic image sensing device by an immediately preceding image sensing operation, in such a manner that the images of the subject coincide. A combining control device controls the combining device so as to repeatedly execute processing for generating one frame of a combined image updated by combining the combined image, which is the result of combination by the combining device, with the image of the subject represented by image data that has been output from the solid-state electronic image sensing device, in such a manner that the images coincide.

9 Claims, 21 Drawing Sheets

FOREIGN PATENT DOCUMENTS

| | | |
|---|---|---|
| JP | 2004-357071 A | 12/2004 |
| JP | 2005-176248 A | 6/2005 |
| JP | 2006-54698 A | 2/2006 |
| JP | 2006-173774 A | 6/2006 |
| JP | 2006-310926 A | 11/2006 |
| WO | WO 2006103880 A1 * | 10/2006 |

* cited by examiner

Fig. 8

| | FOCAL LENGTH: f [mm] (CALCULATED IN TERMS OF 35-mm FILM) | | | | | | | |
|---|---|---|---|---|---|---|---|---|
| | 28 | 30 | 50 | 80 | 100 | 120 | 200 | 300 |
| EXPOSURE TIME T1 OVER WHICH CAMERA SHAKE DOES NOT OCCUR | 1/28 SEC. | 1/30 SEC. | 1/50 SEC. | 1/80 SEC. | 1/100 SEC. | 1/120 SEC. | 1/200 SEC. | 1/300 SEC. |

DIGITAL STILL CAMERA AND METHOD OF CONTROLLING IMAGE COMBINATION

BACKGROUND OF THE INVENTION

1. Field of the Invention

This invention relates to a digital still camera and to a method of controlling the same.

2. Description of the Related Art

Since camera shake may occur when a subject is imaged using a digital still camera, a number of digital still cameras have been proposed to deal with this problem. For example, there is a digital still camera that issues a camera-shake warning when camera shake is about to occur (Japanese Patent Application Laid-Open No. 2002-190980); a digital still camera having a camera-shake correcting function (Japanese Patent Application Laid-Open No. 5-14801); a digital still camera in which, when camera shake reaches a certain amount, read-out from an image sensing device is performed and exposure is performed repeatedly to correct for camera shake (Japanese Patent Application Laid-Open No. 2003-32540); a digital still camera that senses the image of a subject continuously and superimposes each of the images so obtained (Japanese Patent Application Laid-Open No. 11-252445); and a digital still camera that mitigates the effects of camera shake by changing the speed of drive for performing read-out from an image sensing device (Japanese Patent Application Laid-Open No. 11-196321).

However, since camera shake is not prevented in any of these cameras, there are occasions where blurry images are obtained.

Further, there is also a technique in which the image of a subject is sensed continuously and an image exhibiting little camera shake is recorded from among the multiple frames of images thus obtained (Japanese Patent Application Laid-Open No. 11-136557).

Nevertheless, it is difficult to obtain an image that is free of camera shake if a time-exposure photograph is taken.

Furthermore, although there is a technique for combining multiple frames of images obtained by continuous imaging (Japanese Patent Application Laid-Open No. 2004-357071), it is difficult to obtain an image that is sharp and devoid of camera shake. In addition, it is difficult to obtain an image having the brightness desired by the user.

SUMMARY OF THE INVENTION

Accordingly, an object of the present invention is to obtain an image that is sharp and devoid of camera shake.

A further object of the present invention is to obtain, in a comparatively simple manner, an image having brightness desired by the user.

According to a first aspect of the present invention, the foregoing objects are attained by providing a digital still camera comprising: a solid-state electronic image sensing device for sensing the image of a subject and outputting image data representing the image of the subject; an exposure-time setting device for setting an exposure time for sensing the image of the subject using the solid-state electronic image sensing device; a determination device for determining whether the exposure time that has been set by the exposure-time setting device is longer than a period of time over which camera shake is thought to occur; an imaging control device, responsive to a determination by the determination device that the exposure time that has been set by the exposure-time setting device is longer than the period of time over which camera shake is thought to occur, for controlling the solid-state electronic image sensing device so as to sense the image of the subject repeatedly a plurality of times over a period of time in which camera shake is thought not to occur, in such a manner that overall exposure time of image sensing performed a plurality of times will become the exposure time that has been set by the exposure-time setting device; a subtracting device for subtracting black-level data from each item of image data of a plurality of frames of image data representing a plurality of frames of images of the subject obtained by performing image sensing the plurality of times under the control of the imaging control device; and a generating device for generating one frame of the image of the subject by combining a plurality of frames of images of the subject, which are represented by the plurality of frames of image data from which the black-level data has been subtracted by the subtracting device, in such a manner that the plurality of frames of images of the subject coincide with one another.

The first aspect of the present invention also provides an operation control method suited to the digital still camera described above. Specifically, there is provided a method of controlling operation of a digital still camera comprising: a step of a solid-state electronic image sensing device sensing the image of a subject and outputting image data representing the image of the subject; a step of an exposure-time setting device setting an exposure time for sensing the image of the subject using the solid-state electronic image sensing device; a step of a determination device determining whether the exposure time that has been set by the exposure-time setting device is longer than a period of time over which camera shake is thought to occur; in response to a determination by the determination device that the exposure time that has been set by the exposure-time setting device is longer than the period of time over which camera shake is thought to occur, a step of an imaging control device controlling the solid-state electronic image sensing device so as to sense the image of the subject repeatedly a plurality of times over a period of time in which camera shake is thought not to occur, in such a manner that overall exposure time of image sensing performed a plurality of times will become the exposure time that has been set by the exposure-time setting device; a step of a subtracting device subtracting black-level data from each item of image data of a plurality of frames of image data representing a plurality of frames of images of the subject obtained by performing image sensing the plurality of times under the control of the imaging control device; and a step of a generating device generating one frame of the image of the subject by combining a plurality of frames of images of the subject, which are represented by the plurality of frames of image data from which the black-level data has been subtracted by the subtracting device, in such a manner that the plurality of frames of images of the subject coincide with one another.

In accordance with the first aspect of the present invention, exposure time is set and it is determined whether the set exposure time is longer than a period of time over which camera shake is thought to occur. If it is determined that the set exposure time is longer, then the image of the subject is sensed repeatedly a plurality of times over an exposure time in which camera shake is thought not to occur, in such a manner that overall exposure time will become the exposure time that has been set. Black-level data is subtracted from each item of image data of a plurality of frames of image data representing a plurality of frames of images of the subject obtained. One frame of the image of the subject is generated by combining a plurality of frames of the images of the subject, which are represented by the plurality of frames of image data from which the black-level data has been subtracted, in such a manner that the plurality of frames of the images of the subject coincide with one another.

In accordance with the first aspect of the present invention, since the image of the subject is sensed repeatedly a plurality of times over an exposure time in which camera shake is thought not to occur, it is believed that each of the plurality of frames of images of the subject will be free of blur. Since one frame of the image of the subject is generated by combining the blur-free plurality of frames of images of the subject, a blur-free combined image is obtained. In particular, since black-level data is subtracted from image data representing each of the plurality of frames of images of the subject that are to be combined, a sharp image in which black is subdued is obtained. Further since the overall exposure time over which imaging is repeated becomes the set exposure time, a combined image having the brightness desired by the user is obtained.

The digital still camera may further comprise: a mechanical shutter for controlling exposure of the solid-state electronic image sensing device; and a control device for controlling the mechanical shutter and the imaging control device in such a manner that image sensing performed the first time among the plurality of times is carried out upon closing the mechanical shutter. In this case, the subtracting device would subtract the black-level image data from each item of image data of a plurality of frames of image data representing a plurality of frames of images of the subject with the exception of a black-level image, which is obtained by image sensing performed the first time carried out under the control of the control device, from among the plurality of frames of the images of the subject.

The digital still camera may further comprise: a zoom magnification setting device for setting a zoom magnification; and an electronic-zoom processing device for executing electronic-zoom processing, in accordance with the zoom magnification set by the zoom magnification setting device, with regard to each image of the subject of the plurality of frames thereof represented by the plurality of frames of the image data from which the black-level data has been subtracted by the subtracting device, the electronic-zoom processing enlarging images, within electronic-zoom zones, which have a size conforming to the zoom magnification set by the zoom magnification setting device and which coincide when combined as one frame of an image. In this case, the generating device would generate one frame of the image of the subject obtained by combining the images within the electronic-zoom zones in respective ones of the plurality of frames of images of the subject, which have been subjected to electronic-zoom processing by the electronic-zoom processing device, in such a manner that the images coincide with one another.

Preferably, the period of time over which camera shake is thought not to occur when zoom magnification has been set by the zoom magnification setting device is shorter then the period of time over which camera shake is thought not to occur when zoom magnification has not been set.

The digital still camera may further comprise an exposure-time deciding device for deciding exposure time over which camera shake is thought not to occur, based upon the zoom magnification set by the zoom magnification setting device.

The digital still camera may further comprise a noise removing device for removing noise components from the plurality of frames of image data from which the black-level data has been subtracted by the subtracting device. In this case, the generating device would generate one frame of the image of the subject by combining a plurality of frames of images of the subject, which are represented by the plurality of frames of the image data from which the noise components have been removed by the removing device, in such a manner that the plurality of frames of images of the subject coincide with one another.

According to a second aspect of the present inventions the foregoing objects are attained by providing a digital still camera comprising: a solid-state electronic image sensing device for sensing the image of a subject repeatedly for an exposure time over which camera shake is thought not to occur, and repeatedly outputting image data representing the image of the subject; a combining device for generating one frame of a combined image obtained by combining the image of the subject represented by image data that has been output from the solid-state electronic image sensing device with the image of the subject represented by image data that was output from the solid-state electronic image sensing device by an immediately preceding image sensing operations in such a manner that the images of the subject coincide; a combining control device for controlling the combining device so as to repeatedly execute processing for generating one frame of a combined image updated by combining the combined image, which is the result of combination by the combining device, with the image of the subject represented by image data that has been output from the solid-state electronic image sensing device, in such a manner that the images coincide; a display device for displaying the combined image obtained by the processing in the combining device controlled by the combining controller; and a recording control device for recording, on a recording medium in response to an exposure-halt command and on the basis of timing at which the exposure-halt command has been applied, image data representing the combined image updated in the processing in the combining device that is based upon the combining control device.

The second aspect of the present invention also provides an operation control method suited to the digital still camera described above. Specifically, there is provided a method of controlling operation of a digital still camera comprising: a step of a solid-state electronic image sensing device sensing the image of a subject repeatedly for an exposure time over which camera shake is thought not to occur, and repeatedly outputting image data representing the image of the subject; a step of a combining device generating one frame of a combined image obtained by combining the image of the subject represented by image data that has been output from the solid-state electronic image sensing device with the image of the subject represented by image data that was output from the solid-state electronic image sensing device by an immediately preceding image sensing operation, in such a manner that the images of the subject coincide; a step of a combining control device controlling the combining device so as to repeatedly execute processing for generating one frame of a combined image updated by combining the combined image, which is the result of combination by the combining device, with the image of the subject represented by image data that has been output from the solid-state electronic image sensing device; a step of a display device displaying the combined image obtained by the processing in the combining device controlled based upon the combining controller; and a step of a recording control device recording, on a recording medium in response to an exposure-halt command and on the basis of timing at which the exposure-halt command has been applied, image data representing the combined image updated in the processing in the combining device that is based upon the combining control device.

In accordance with the second aspect of the present invention, the image of a subject is sensed repeatedly for an exposure time over which camera shake is thought not to occur.

One frame of a combined is generated. The combined image is the result of combining the image of the subject obtained by image sensing with the image of the subject obtained by the immediately preceding image sensing operation, in such a manner that the images of the subject coincide. Sensing of the image of the subject is repeated and combining processing for combining the sensed image of the subject with the combined image that has been generated is repeated. The combined image generated is displayed and, when an exposure-halt command is applied, the image data representing the combined image is recorded on a recording medium.

Combined images are obtained while the combined images are updated. The combined image is displayed. When a combined image having the desired brightness is displayed, the user applies the exposure-halt command, whereby the image data representing the combined image having the desired brightness can be recorded on the recording medium. Moreover, since the combined image obtained is one that results from combining images sensed by an exposure time over which camera shake is thought not to occur, the combined image also is free of blur.

The solid-state electronic image sensing device may halt image sensing by sensing a first plurality of frames of images of the subject after the exposure-halt command is applied. In this case, the digital still camera may further comprise a temporary memory for temporarily storing the image data, which is repeatedly output from the solid-state electronic image sensing device, while updating a second plurality of frames of image data that is greater than the first plurality of frames.

The recording control device may record the second plurality of frames of image data, which has been stored in the temporary memory, on the recording medium in addition to the image data representing the updated combined image.

The display device may display a histogram of the displayed combined image in addition to the combined image.

The digital still camera may further comprise: a determination device for determining whether the updated combined image has an appropriate brightness; and an alert device for notifying of appropriate brightness in response to a determination by the determination device that the updated combined image has an appropriate brightness.

The digital still camera may further comprise a control device for controlling the solid-state electronic image sensing device so as to halt image sensing, in response to a determination by the determination device that the updated combined image has an appropriate brightness.

The digital still camera may further comprise a shutter-release button. In this case, the solid-state electronic image sensing device would repeat sensing of the image of the subject while the shutter-release button is being pressed and would halt image sensing in response to release of the shutter-release button.

The shutter-release button may be of the two-stage-stroke type. In this case, the solid-state electronic image sensing device would repeat sensing of the image of the subject in response to pressing of the shutter-release button through the first stage of its stroke, and would halt sensing of the image of the subject in response to pressing of the shutter-release button through the second stage of its stroke.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 illustrates the relationship between focal length calculated in terms of 35-mm film and exposure time over which camera shake is thought not occur.

DESCRIPTION OF THE PREFERRED EMBODIMENTS

Preferred embodiments of the present invention will be described in detail with reference to the drawings.

In this embodiment, exposure time for sensing the image of a subject is set and it is determined whether the set exposure time is longer than a period of time over which camera shake is thought to occur. If it is determined that the set exposure time is longer, then the image of the subject is sensed repeatedly over a period of time in which camera shake is thought not to occur. The number of times image sensing is performed is decided in such a manner that overall exposure time over which image sensing is performed repeatedly will become the set exposure time. The plurality of frames of images of the subject obtained by repetitive image sensing are combined into a single frame of an image so as not to deviate from one another. Image data representing the image obtained by such combining is recorded on a memory card.

In particular, in this embodiment, a mechanical shutter is used and the initial frame of the image is sensed in a state in which the mechanical shutter is closed, whereby a black image is obtained. The black image is subtracted from the plurality of frames of images of the subject obtained by image sensing, and the plurality of frames of images of the subject from which the black image has been subtracted are combined into the single frame of the image. Since processing for combining images is thus executed using the plurality of frames of images of the subject from which the black image has been subtracted, a sharp combined image is obtained.

Figure 1:
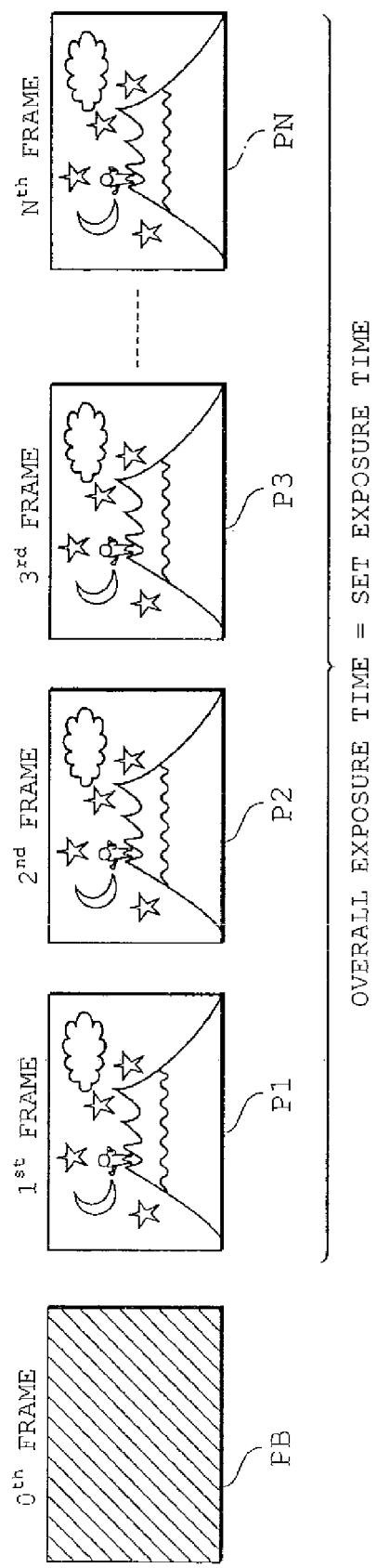
FIG. 1 illustrates an example of images of a subject.

FIG. 1 illustrates an example of images of a subject.

Assume that the set exposure time is longer than the period of time over which camera shake is thought to occur, as mentioned above. A $0^{th}$ frame of the image of the subject (a black image) PB is obtained by performing image sensing upon closing the mechanical shutter. The image of the subject is sensed N times in an exposure time over which camera shake is thought not to occur, and N frames P1 to PN of images of the subject are obtained. The number (N) of frames imaged and the exposure time of each of the N frames of images of the subject are decided in such a manner that the overall exposure time of the N frames of images of the subject will be equal to the set exposure time.

Figure 2:
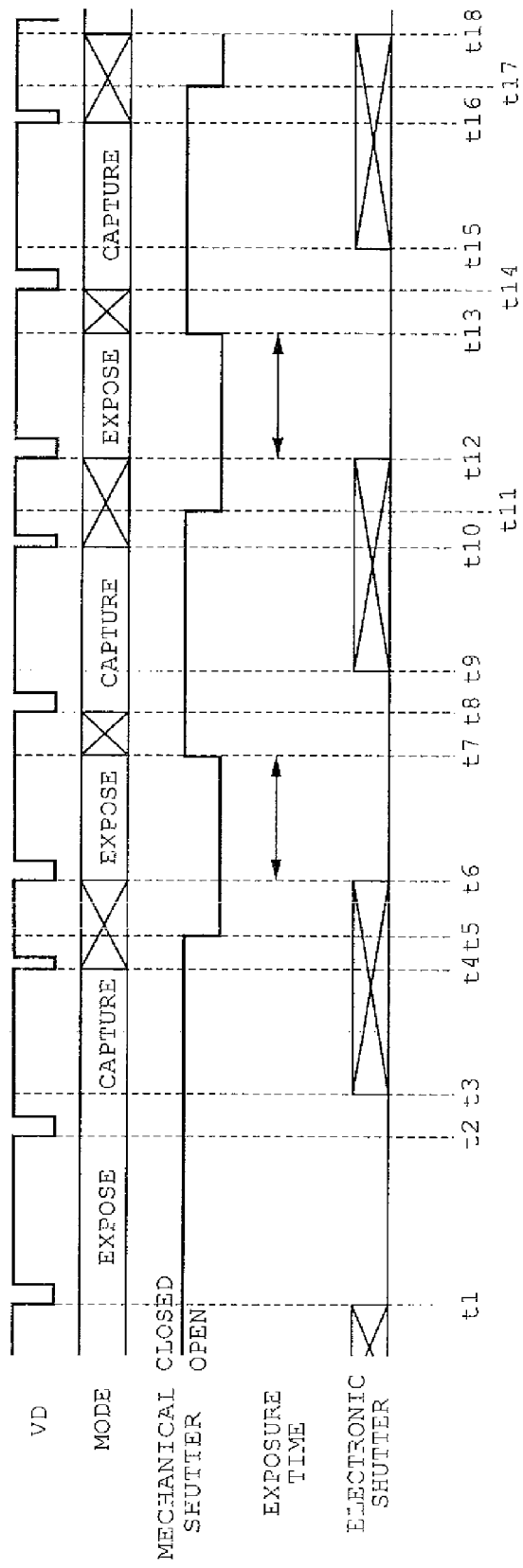
FIG. 2 is a time chart of image sensing.

FIG. 2 is a time chart for obtaining the images of the subject of FIG. 1 using a CCD.

Exposure and transfer (capture) of signal charge that has accumulated in the CCD are carried out in synch with a vertical synchronizing signal generated at times t1, t2, t4, t6, t8, t10, t12, t14, t16, etc. In the time period up to time t1, in the time period from t3 to t6 and in the time period from t9 to t12, an electronic shutter pulse (a substrate sweep pulse) is applied to the CCD and signal charge that has accumulated in the photodiodes of the CCD is swept out of the substrate.

The mechanical shutter is closed from time t1 to time t5. Since generation of the electronic shutter pulses stops when time t1 arrives, accumulation of signal charge in the photodiodes of the CCD starts. When time t2 arrives, a readout pulse is generated and capture of the signal charge that has accumulated in the photodiodes begins. The image represented by the signal charge that has accumulated in the photodiodes from time t1 to time t2 is the black image PB of the $0^{th}$ frame shown in FIG. 1.

The mechanical shutter is opened from time t5 to time t7. However, since the electronic shutter pulses are being generated up to time t6, signal charge accumulates in the photodiodes from time t6. Since the mechanical shutter is closed when time t7 arrives, the period of time from t6 to t7 becomes the exposure time. This exposure time is the time period over which camera shake is thought not to occur, as mentioned above. When time t8 arrives, a readout pulse (not shown) is generated and capture of the accumulated signal charge begins. The image represented by the signal charge thus obtained is the subject image P1 of the first frame shown in FIG. 1.

Similarly, the period of time from t12 to t13 becomes the exposure time and capture of the signal charge begins from time t14. The image represented by the signal charge thus captured is the subject image P2 of the second frame shown in FIG. 1.

Images of the subject up to the Nth frame shown in FIG. 1 are obtained in similar fashion.

Figure 3:
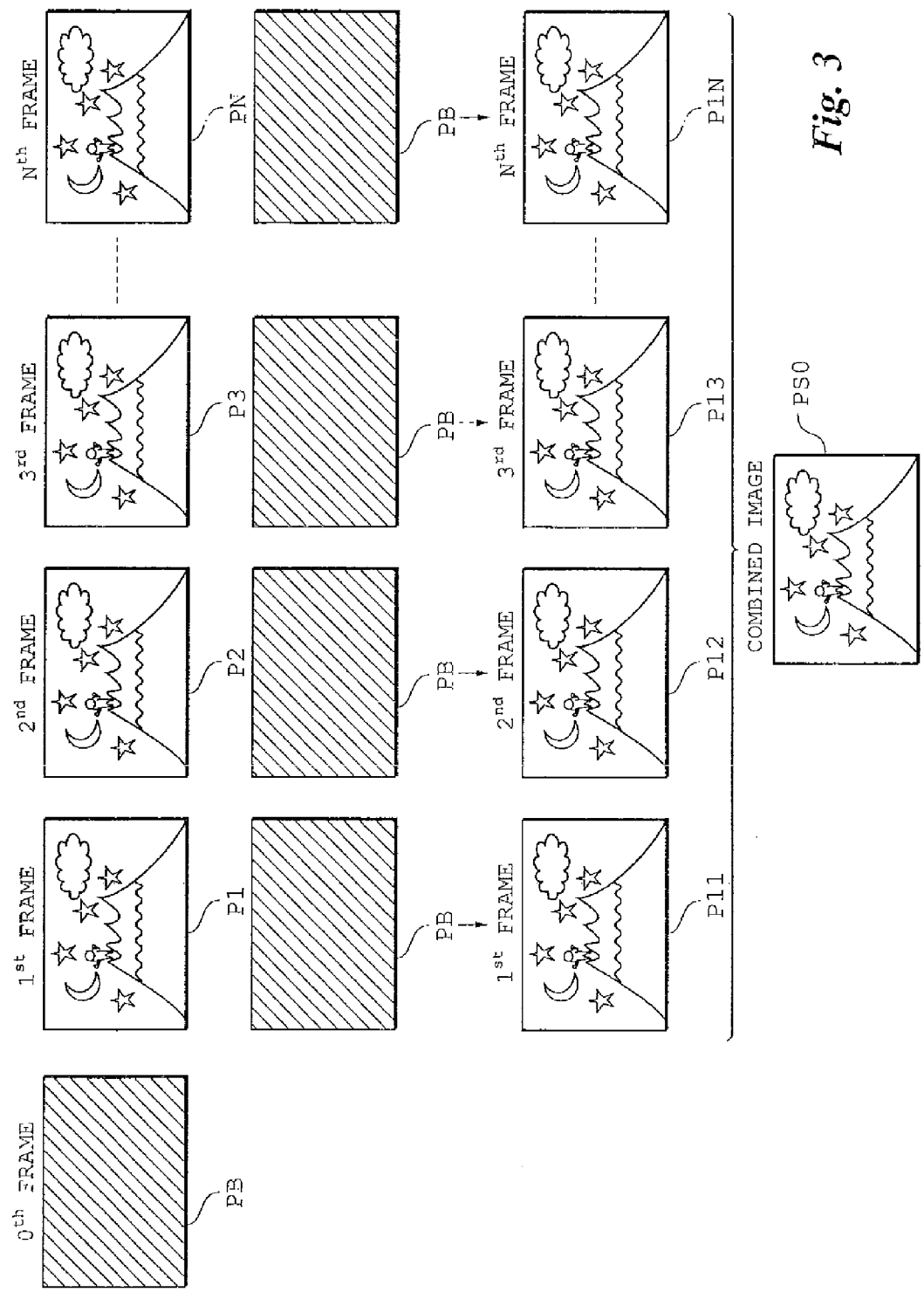
FIG. 3 illustrates how a combined image is generated.

FIG. 3 illustrates how a combined image is generated.

As mentioned above, the black image PB of the $0^{th}$ frame and the subject images P1 to PN of the first to Nth frames are obtained. The black image PB is subtracted from each of the subject images P1 to PN of the first to Nth frames, and subject images P11 to P1N of the first to Nth frames from which the black image PB has been subtracted are obtained. One frame of a combined image PS0 is obtained by combining the thus obtained subject images P11 to P1N of the first to Nth frames in such a manner that they coincide. Preferably, noise components in the subject images P11 to P1N from which the black image PB has been subtracted are removed as by utilizing a digital filter and the combined image PS0 is generated using the subject images P11 to P1N from which noise has been removed.

Figure 4:
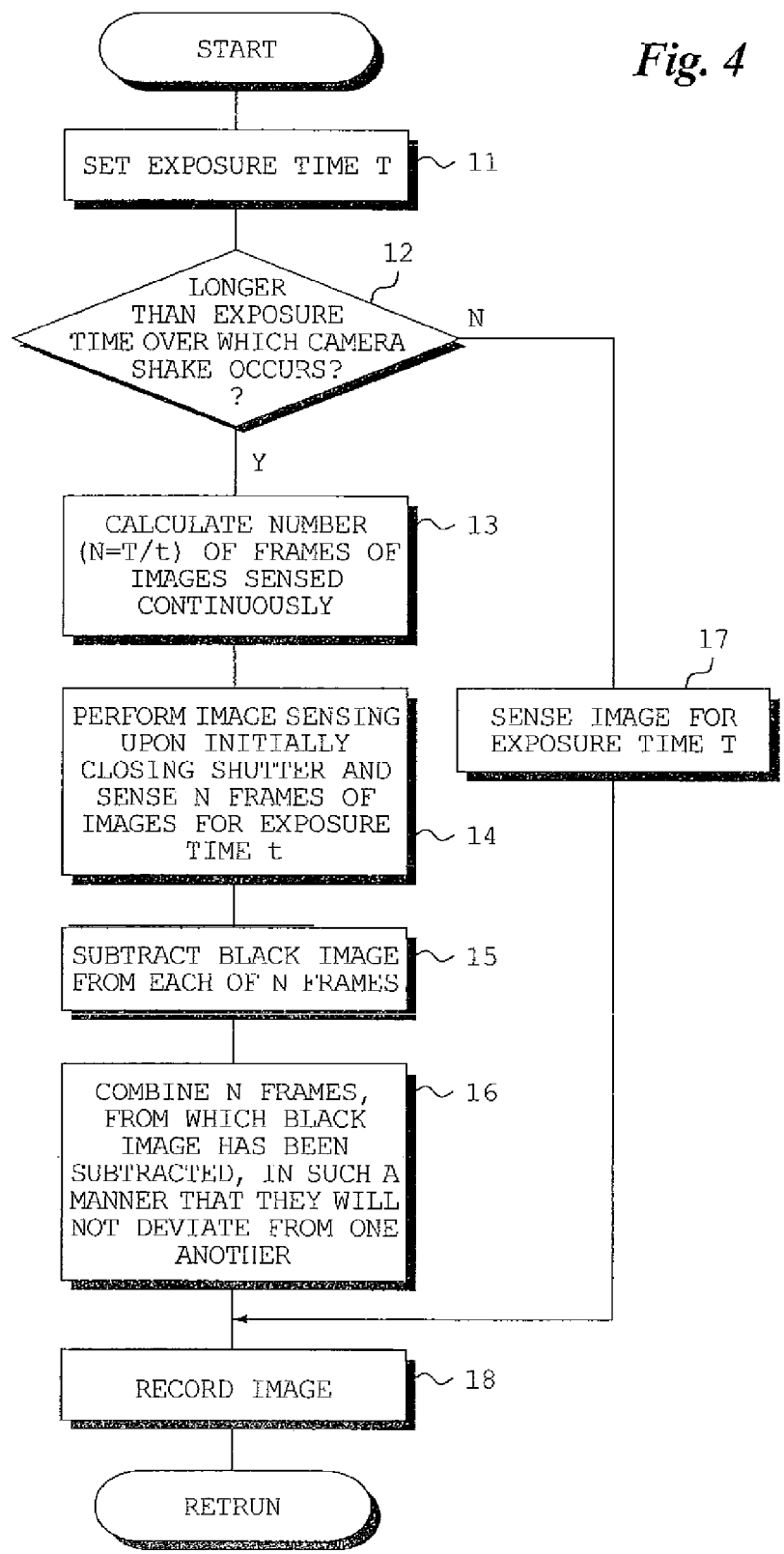
FIG. 4 is a flowchart illustrating processing for generating a combined image.

FIG. 4 is a flowchart illustrating the procedure through which the combined image is generated.

First, an exposure time T is set (step 11), then it is determined whether the set exposure time T is longer than a period of time over which camera shake occurs (step 12). The exposure time T may be set by the user or may be calculated automatically. In a case where the exposure time T is set by the user, the digital still camera is provided with a dial or the like for setting the exposure time T (the shutter speed). If the exposure time T is calculated automatically, then it is calculated based upon an amount of exposure detected by an AE detection circuit (AE/AWB detection circuit) provided in the digital still camera, as will be described later.

If the set exposure time T is longer than the period of time over which camera shake occurs ("YES" at step 12), then the number N of frames (N=T/t) of the image sensed repeatedly for a length of time t (e.g., 1/60 of a second) over which camera shake does not occur is calculated (step 13). A black image is obtained by sensing the image of the initial frame (0th frame) upon closing the mechanical shutter. The image of the subject is thenceforth sensed for the length of time t, over which camera shake does not occur, repeatedly, with the calculated N-number of frames being imaged (step 14).

The black image is subtracted from each subject image of the N frames of the subject images sensed (step 15), and combined-image generation processing, which generates one frame of a combined image in such a manner that the N frames of the subject images from which the black image has been subtracted will not deviate from one another, is executed (step 16). It goes without saying that an overlap position is decided by motion detection processing and edge detection processing of each subject image in order to generate one frame of a combined image in a window in such a manner that the N frames of the subject images will not deviate from one another. Image data representing the combined image thus generated is recorded on a memory card (step 18). A blur-free image having a brightness based upon the exposure time set by the user is obtained. Moreover, since the combining of images is performed upon subtracting the black image from the images of the subject, as mentioned above, a sharp image is obtained.

If the set exposure time is not longer than an exposure time over which camera shake occurs ("NO" at step 12), then one frame of the image of the subject is sensed for the length of the set exposure time T (step 17).

Figure 5:
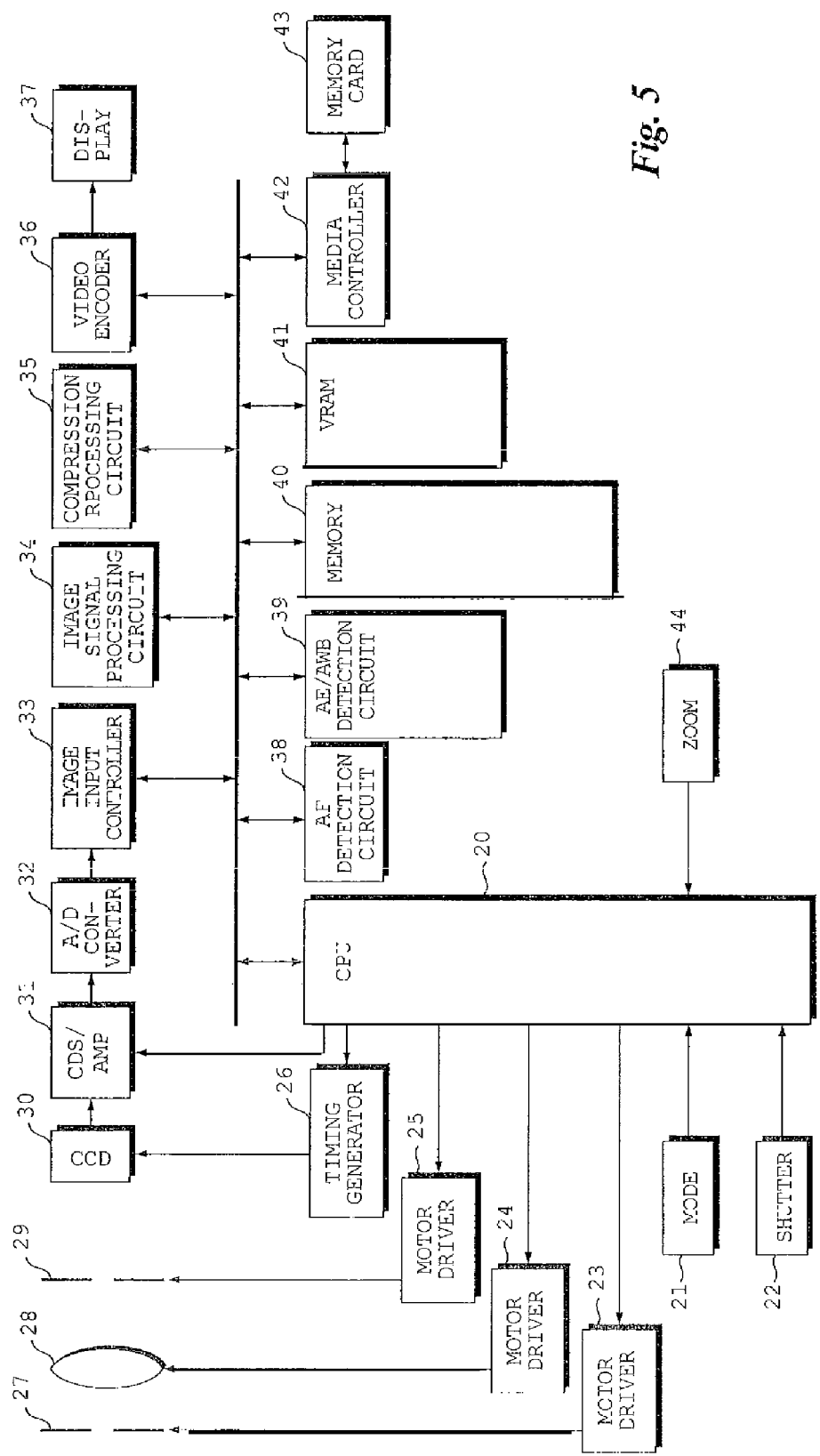
FIG. 5 is a block diagram illustrating the electrical configuration of a digital still camera.

FIG. 5 is a block diagram illustrating the electrical configuration of a digital still camera.

The operation of the overall digital still camera is controlled by a CPU 20.

The digital still camera includes a memory 40 for storing desired data, etc., and a VRAM (Video Random-Access Memory) 41 for temporarily storing image data representing the image of a subject to be displayed.

The digital still camera has a mode switch 21 for setting an imaging mode and a playback mode, a shutter-release button 22 and a zoom button 44 for setting zoom magnification. Signals that are output from these switches and buttons are input to the CPU 20.

An iris 27, a focusing lens 28 and a mechanical shutter 29 are provided in front of the photoreceptor surface of a CCD 30. The iris 27, focusing lens 28 and mechanical shutter 29 are controlled by motor drivers 23, 24 and 25, respectively. Light that has passed through the focusing lens 28 and mechanical shutter 29 impinges upon the photoreceptor surface of the CCD 30. If the imaging mode is set, the CCD 30 is controlled by a timing generator 26 and the CCD 30 outputs a video signal representing the image of the subject.

The video signal that has been output from the CCD 30 is subjected to correlated double sampling in a CDS amplifying circuit 31 and the resultant video signal is input to an analog/digital converting circuit 32. The latter converts the video signal to digital image data.

The digital image data is input to an AF detection circuit 38 via an image input controller, and automatic-focus evaluation data for controlling automatic focus is obtained. The focusing lens 28 is positioned at the in-focus position based upon the automatic-focus evaluation data obtained. Further, the image data is input also to an AE/AWB detection circuit 39, whereby luminance data for adjusting automatic exposure is generated. The iris 27 is controlled using the generated luminance data in such a manner that the appropriate brightness is obtained. Further, data for adjusting white balance is detected in the AE/AWB detection circuit 39, and the white balance is adjusted in an image signal processing circuit 34 The image data that has been output from the image signal processing circuit 34 is applied to a display unit 37 via a video encoder 36, whereby the sensed image of the subject is displayed on the display screen of the display unit 37.

If, when the shutter-release button 22 is pressed, the set exposure time is longer than the period of time over which camera shake occurs, then the initial frame of imaging is performed with the mechanical shutter 29 in the closed state, after which the image of the subject is sensed repeatedly for a plurality of frames for the length of an exposure time over which camera shake does not occur, as mentioned above. If the set exposure time is shorter than the period of time over which camera shake occurs, then the image of the subject is sensed for the length of the set exposure time. A plurality of frames of image data are obtained by sensing the image of the subject for the plurality of frames, as described above. The image data representing the black image obtained by the initial imaging operation and the image data representing the plurality of frames of images of the subject obtained by the subsequent imaging a plurality of times is applied to the memory 40 and stored there temporarily. The image data representing the plurality of frames of images of the subject is read out of the memory 40 successively, and the image data representing the black image is read out of the memory 40 as well. The read image data and read black-image data is applied to the image signal processing circuit 34, where processing is executed for subtracting the image data representing the black image from the image data representing the image of the subject. This subtraction processing is executed with regard to all of the plurality of frames of image data and image combining processing is executed in the manner described above. Image data representing the combined image generated is compressed by a compression processing circuit 35 and then recorded on a memory card 43 by a media controller 42.

FIGS. 6 to 10 illustrate another embodiment of the present invention. Here zoom imaging is performed. In this embodiment, electronic zoom rather optical zoom is performed.

Figure 6:
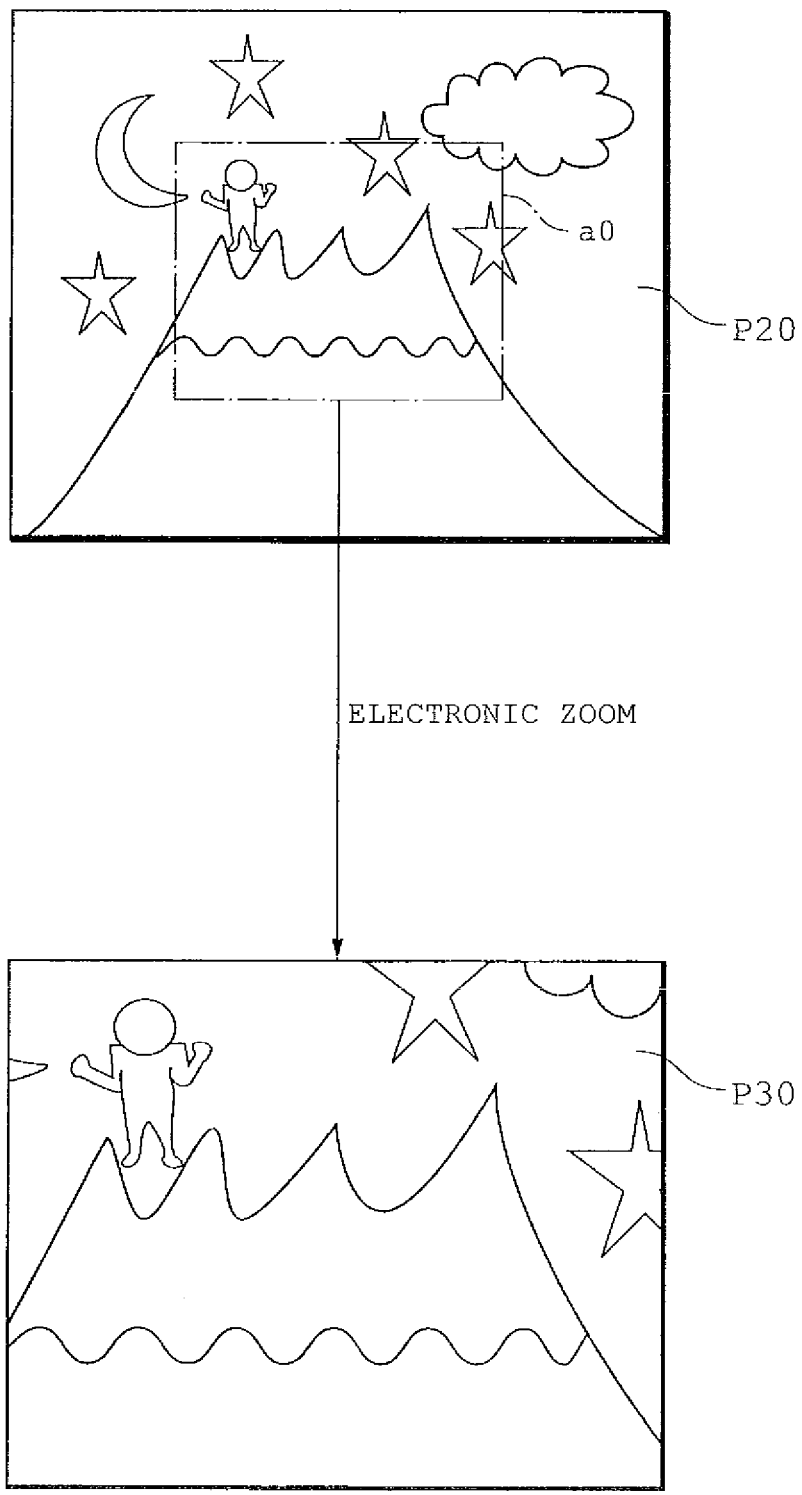
FIG. 6 illustrates an image enlarged by electronic zoom.

FIG. 6 illustrates the manner in which the image of a subject is enlarged by electronic zoom.

A subject image P20 is obtained by sensing the image of the subject. Set within the subject image P20 is an electronic zoom zone a0 the size of which decreases as the zoom magnification increases and increases as the zoom magnification decreases.

The size of the image within the electronic zoom zone a0 is enlarged so as to be the same as the size of the subject image P20, whereby an electronically zoomed subject image P30 is obtained.

Figure 7:
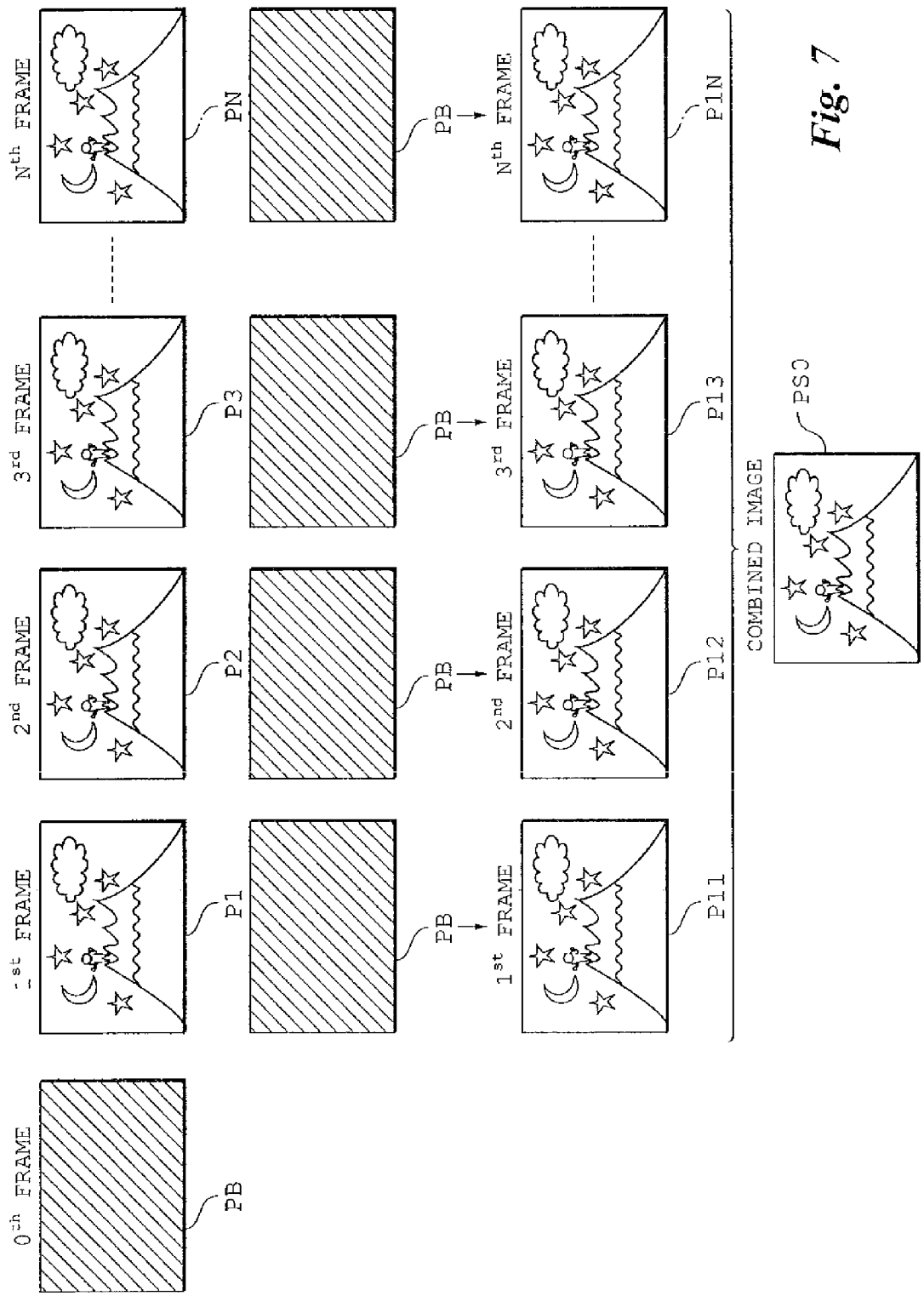
FIG. 7 illustrates how a combined image obtained by combining images enlarged by electronic zoom is generated.

FIG. 7, which corresponds to FIG. 3, illustrates how a combined image is generated.

By performing imaging repeatedly N times, as mentioned above, N frames of images of the subject are obtained and a black image is subtracted from each of the N frames of subject images to obtain N frames P21 to P2N of subject images. By designating a zoom magnification, electronic zoom zones a21 to a2N conforming to the designated zoom magnification are defined. The electronic zoom zones a21 to a2N are defined so as to coincide in a case where the images within the electronic zoom zones are enlarged and combined as a single frame of an image.

The images within the electronic zoom zones a21 to a2N thus defined are enlarged in accordance with the zoom magnification, whereby enlarged zoom images P31 to P3N are obtained. The zoomed images P31 to P3N obtained are combined so as to coincide, whereby a combined image PZ is obtained.

Since electronic zoom and not optical zoom is performed in this embodiment, the electronic zoom zones a21 to a2N can be defined so as to coincide when the zoomed images are combined to generate the combined image PZ.

FIG. 8 illustrates exposure times over which camera shake is thought not to occur when zoom focal length is calculated in terms of 35-mm film.

The larger the focal length (the greater the zoom magnification) in a case where it is calculated in terms of 35-mm film, the more conspicuous image blur due to camera shake becomes. Accordingly, the arrangement is such that exposure time t over which camera shake does not occur is shortened as focal length increases. Since a blur-free image is sensed even if zoom magnification is enlarged, a blur-free image and one having a brightness that is based upon the set exposure time is obtained even in a case where forth above.

Figure 9:
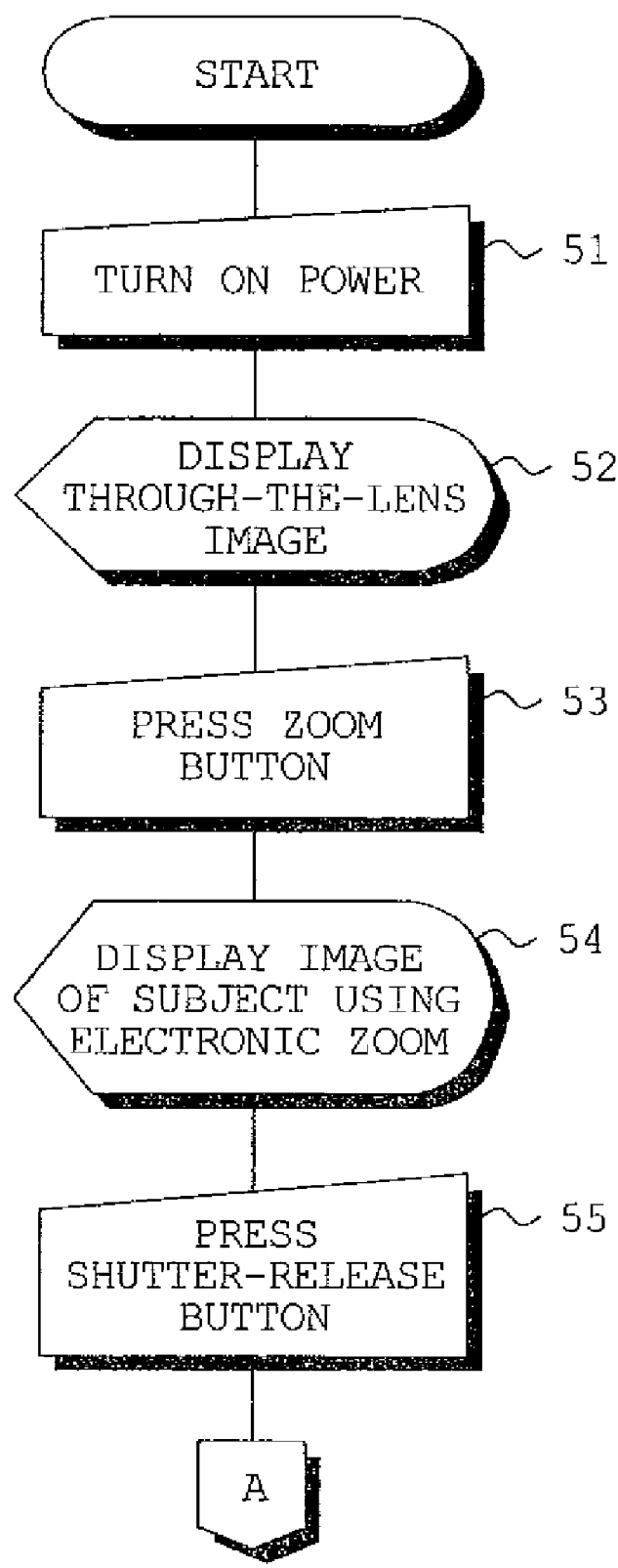
FIGS. 9 and 10 are flowcharts illustrating processing for generating a combined image.
Figure 10:
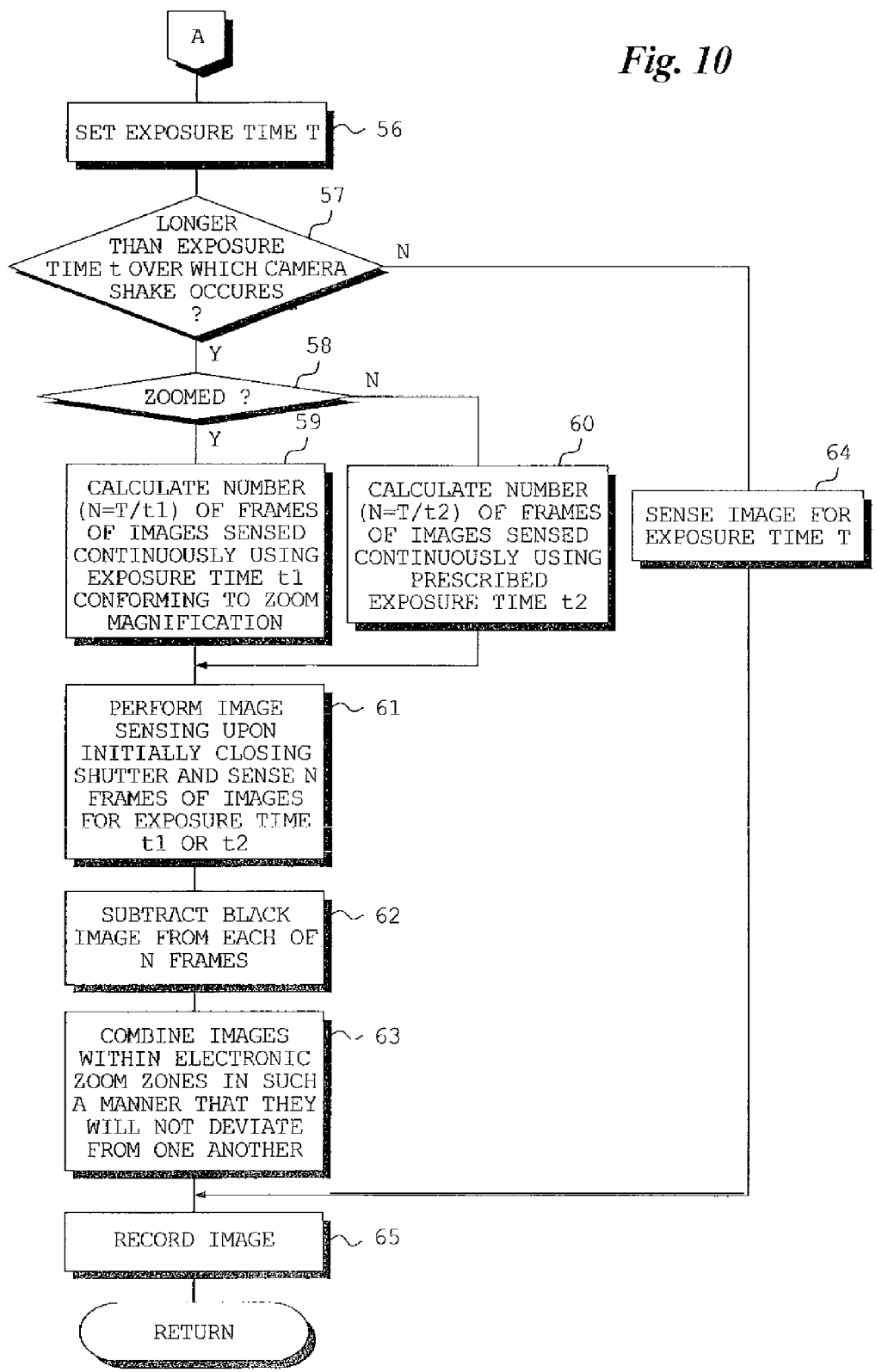

FIGS. 9 and 10 are flowcharts illustrating processing for generating a combined image in a case where zoom processing is executed.

When the power supply of the digital still camera is turned on (step 51), the image of the subject is sensed and a so-called through-the-lens image (moving picture) is displayed (step 52). When the zoom button of the digital still camera is pressed (step 53), electronic zoom processing is executed at the desired zoom magnification. The image of the subject magnified by electronic zoom in the manner described above is displayed in the form of a through-the-lens image on the display unit of the digital still camera (step 54).

When the shutter-release button is pressed (step 55), the exposure time T is set (step 56). It is determined whether the set exposure time T is longer than the exposure time over which camera shake occurs (step 57). In a case where the set exposure time T is longer than the exposure time over which camera shake occurs ("YES" at step 57), then it is determined whether zoom has been set (step 58).

If zoom is being performed ("YES" at step 58), then the number N of frames of imaging is calculated using an exposure time t1 over which camera shake conforming to the zoom magnification is thought not to occur, as shown in FIG. 8 (step 59). If zoom has not been set ("NO" at step 58), then the number N of frames of imaging is calculated using a prescribed exposure time t2 (e.g., ⅟60 of a second) over which camera shake is thought not to occur (step 60).

Next, the mechanical shutter is closed, the initial imaging operation is performed and then imaging is performed repeatedly for N frames, as described above (step 61). The black image is subtracted from each of the N frames of images of the subject (step 62). In each of the image of the subject of the N frames thereof from which the black image has been subtracted, the position of the electronic zoom zone is defined in accordance with the electronic zoom magnification in such a manner that the images within the electronic zoom zones will coincide with one another. Combining processing is executed upon so arranging it that the images within the defined electronic zoom zones will not deviate from one another, thereby generating one frame of a combined image (step 63). Image data representing the combined image generated is recorded on a memory card (step 65). Since zoom processing is performed by electronic zoom, the position of the electronic zoom zone can be decided in each of the sensed N frames of the images of the subject in such a manner that the images within the electronic zoom zones will not deviate from one another in the case where they are combined. By combining the image within the electronic zoom zones thus decided, a blur-free combined image having a brightness that is based upon the set exposure time can be obtained even in a case where zoom has been applied.

If the set exposure time is not longer than an exposure time over which camera shake occurs ("NO" at step 57), then the image of the subject is sensed for the length of the set exposure time (step 64). Image data representing the subject image thus obtained by image sensing is recorded on the memory card (step 65).

Figure 11:
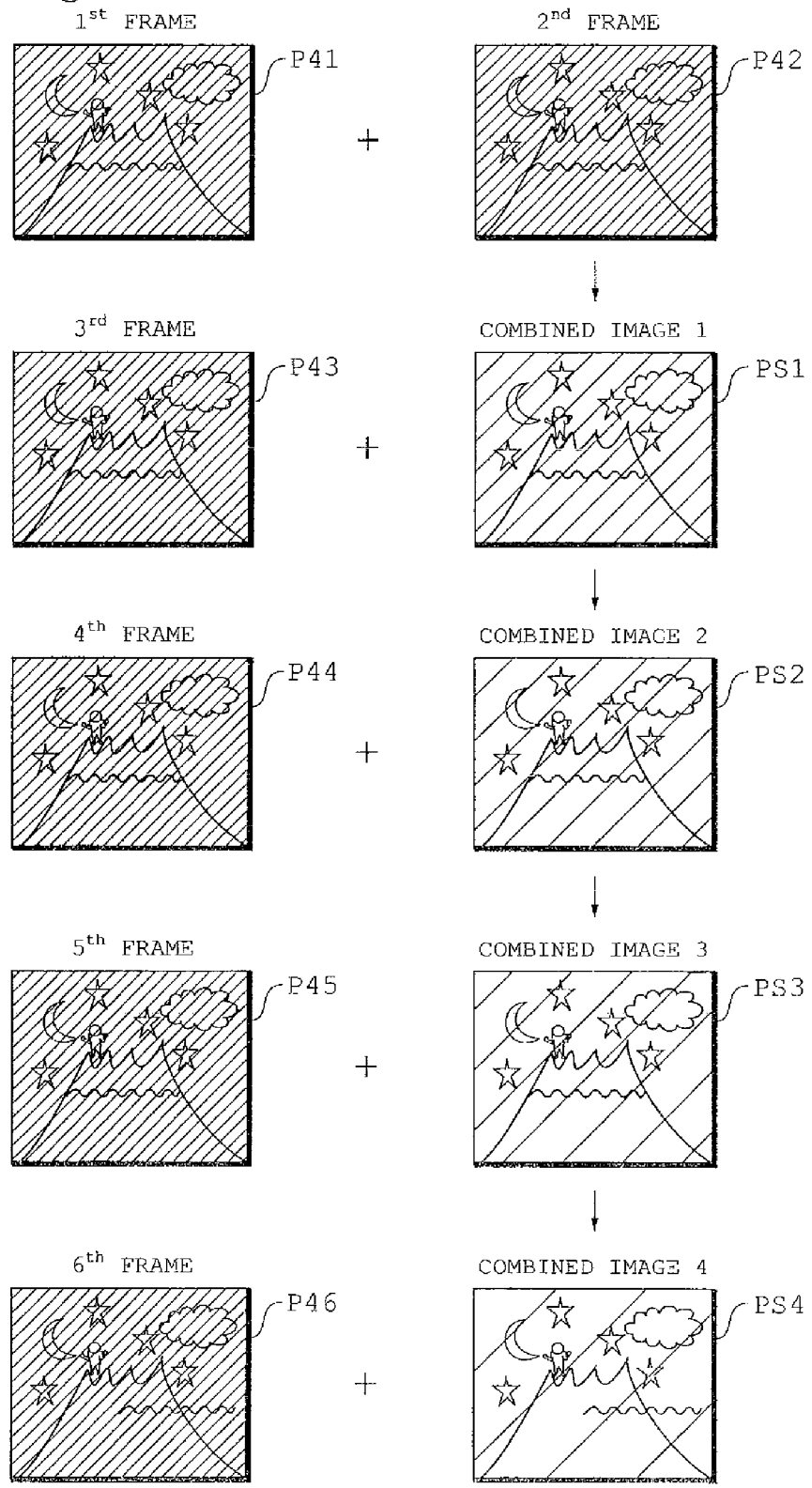
FIG. 11 illustrates how combined images are generated.
Figure 12:
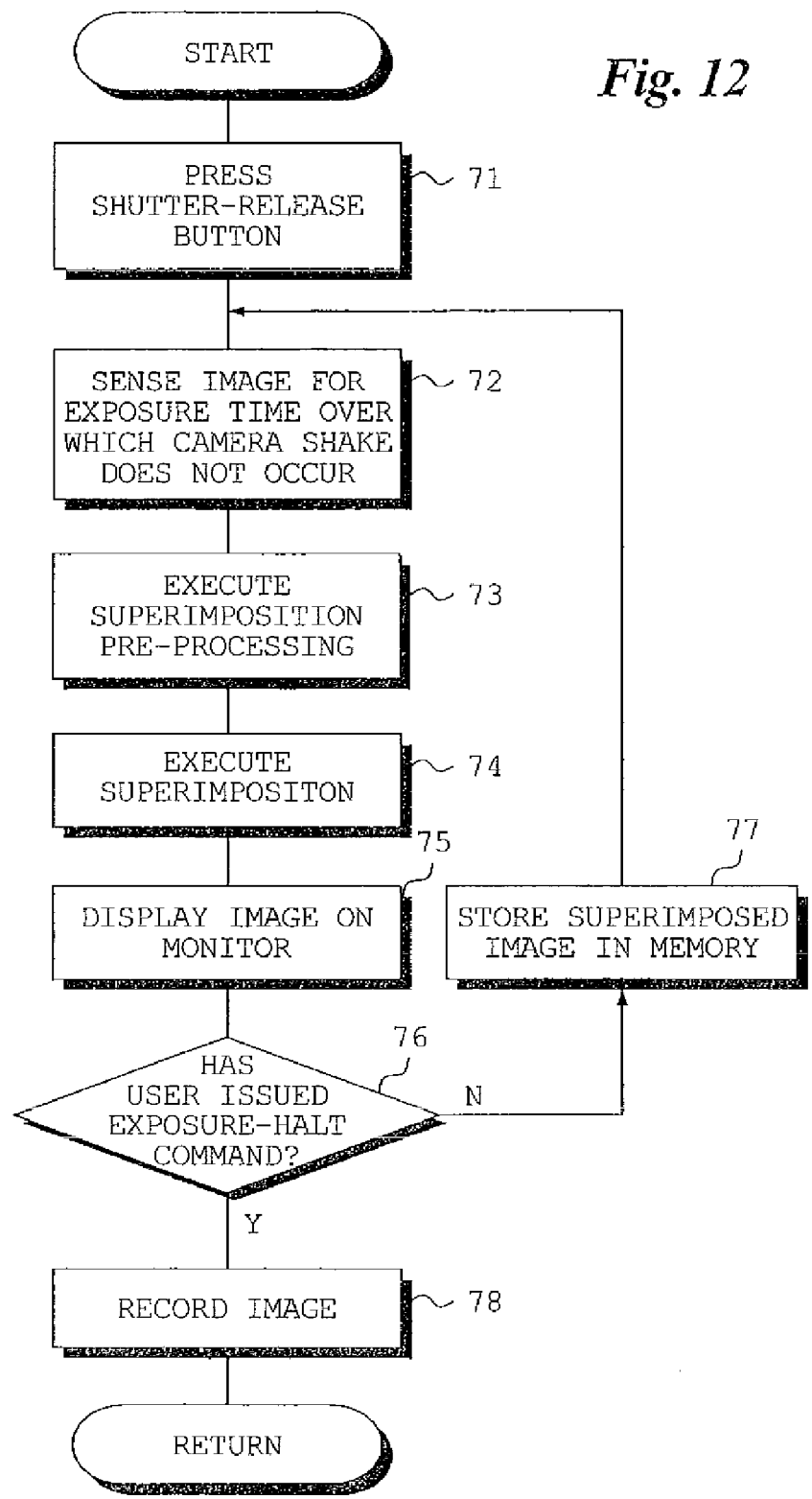
FIG. 12 is a flowchart illustrating processing for generating a combined image.
Figure 13:
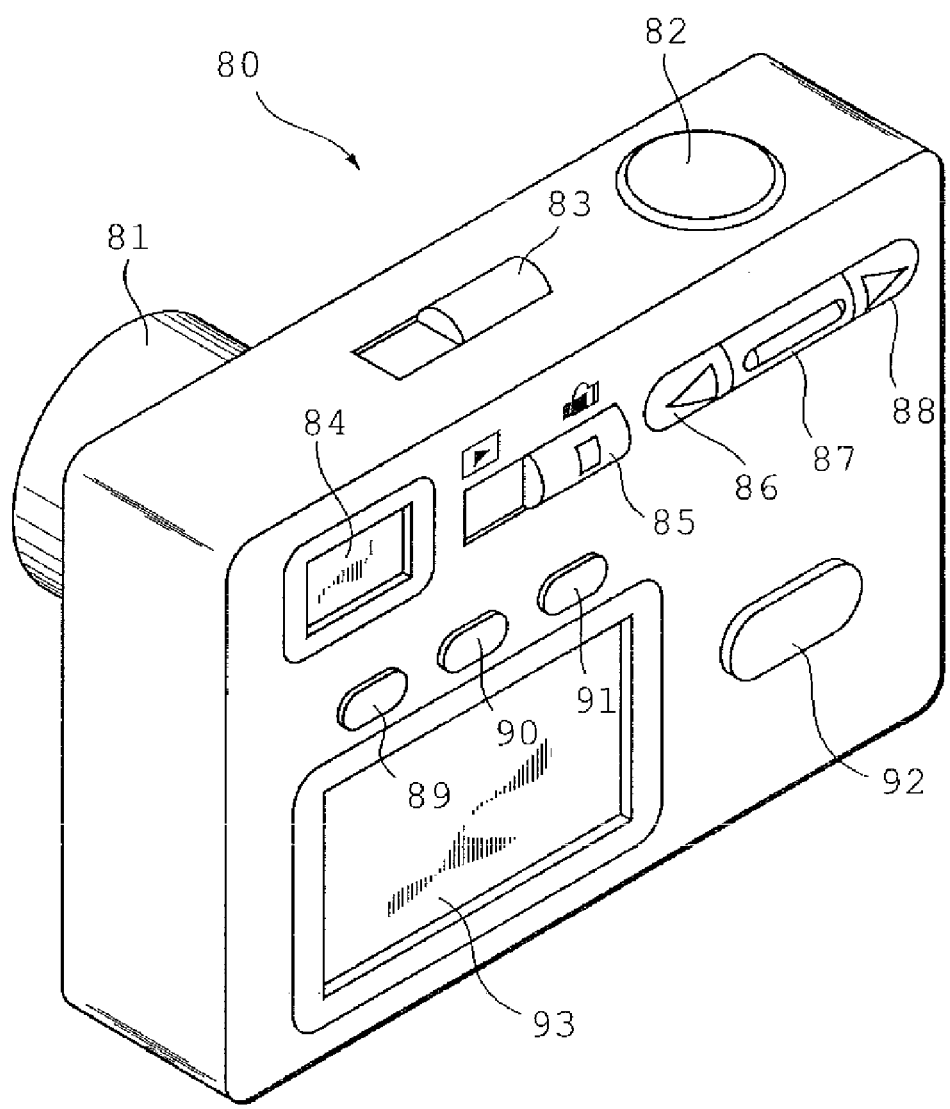
FIG. 13 is a perspective view illustrating a digital still camera.

FIGS. 11 to 13 illustrate another embodiment of the present invention. Here processing is executed in which the image of a subject is sensed continuously for the length of an exposure time over which camera shake does not occur, combining is performed in such a manner that the sensed image of the subject has the image of the subject sensed next superimposed thereon, and this combined image then has the image of the subject sensed next superimposed thereon. This processing is executed repeatedly.

FIG. 13 is a perspective view of a digital still camera 80 as seen from the back thereof.

A lens case 81 is provided on the front side of the digital still camera 80.

A shutter-release button 82 is provided on the top of the digital still camera 80 on the right side thereof. A power button 83 is provided on the left side of the shutter-release button 82.

An optical viewfinder 84 is formed on the back side of the digital still camera 80 at the upper left. A horizontally slidable mode switch 85 is formed to the right of the optical viewfinder 84. The playback mode is set by sliding the mode switch 85 to the left and the imaging mode is set by sliding the mode switch 85 to the right. A left-arrow button 86, decide button 87 and right-arrow button 88 are formed to the right of the mode switch 85.

A liquid crystal display screen 93 is formed on the back side of the digital still camera 80 at the lower left. An exposure-halt button 89 and various other buttons 90, 91 are formed above the liquid crystal display screen 93. A function button 92 is formed to the right of the liquid crystal display screen 93.

FIG. 11 illustrates images of a subject obtained by image sensing and combined images obtained by combining processing, and FIG. 12 is a flowchart illustrating processing according to this embodiment.

When the imaging mode is set and the shutter-release button is pressed (step 71), a first frame of imaging is performed for the length of a predetermined exposure time over which camera shake does not occur (step 72). As a result, a subject image P41 of the first frame is obtained, as illustrated in FIG. 11. The subject image P41 obtained is very dark (darkness is expressed by the density of hatching in FIG. 11).

In this embodiment, a combined image is generated by superimposing images and superimposition pre-processing is performed in order to execute such processing for superimposing images. However, since an image to be superimposed does not yet exist when the first frame of the image of the subject is obtained, superimposition pre-processing (step 73) and superimposition processing (step 74) are skipped. The subject image P41 of the first frame is displayed on the display screen (step 75). If an exposure-halt command is not issued by the user ("NO" at step 76), image data representing the superimposed image is stored in memory temporarily (step 77). Naturally, in a case where the first frame of the image of the subject has been obtained, there is no superimposed image and therefore image data representing this first frame of the subject image is stored in memory temporarily.

Next, a second frame of imaging is performed for the length of exposure time over which camera shake is thought not to occur (step 72). As a result, a subject image P42 of the second frame is obtained, as illustrated in FIG. 11.

In order to superimpose and combine the subject image P41 of the first frame and the subject image P42 of the second frame, superimposition pre-processing, which includes processing for extracting an overlap position such as motion detection processing and edge detection processing applied to the second frame of the subject image, is executed (step 73). Superimposition processing is executed in such a manner that the subject images P41 and P42 of the two frames will coincide (step 74). As a result, a first combined image PS1 is obtained, as illustrated in FIG. 11. The combined image obtained is displayed on the display screen (step 75). If an exposure-halt command is not issued by the user ("NO" at step 76), image data representing the superimposed image is stored in memory temporarily (step 77).

Next, a third frame of imaging is performed for the length of exposure time over which camera shake is thought not to occur (step 72). As a result, a subject image P43 of the third frame is obtained, as illustrated in FIG. 11.

Superimposition processing (step 73) and superimposition processing (step 74) is executed in order to combine the already obtained first combined image PS1 and the subject image P43 of the third frame. By thus combining the subject image P43 of the third frame with the first combined image PS1, a second combined image PS2 is obtained, as illustrated in FIG. 11. The second combined image obtained is displayed on the display screen (step 75).

As long as there is no exposure-halt command from the user, combining processing (superimposition processing) for combining a combined image that has already been obtained with the image of the subject that has been sensed anew is repeated. That is, processing is executed for synthesizing a combined image PS3 by processing for combining a subject image P44 of a fourth frame and the second combined image PS2; processing is executed for synthesizing a combined image PS4 by processing for combining a subject image P45 of a fifth frame and third second combined image PS3; processing is executed for synthesizing a further combined image by processing for combining a subject image P46 of a sixth frame and the fourth combined image PS4; and so on. It will be appreciated that the combined image generated while being updated becomes gradually brighter since exposure time is essentially lengthened.

If an exposure-halt command is issued by the user ("YES" at step 76), then the image data that has been stored in memory temporarily is read out and recorded on a memory card (step 78).

Figure 14:
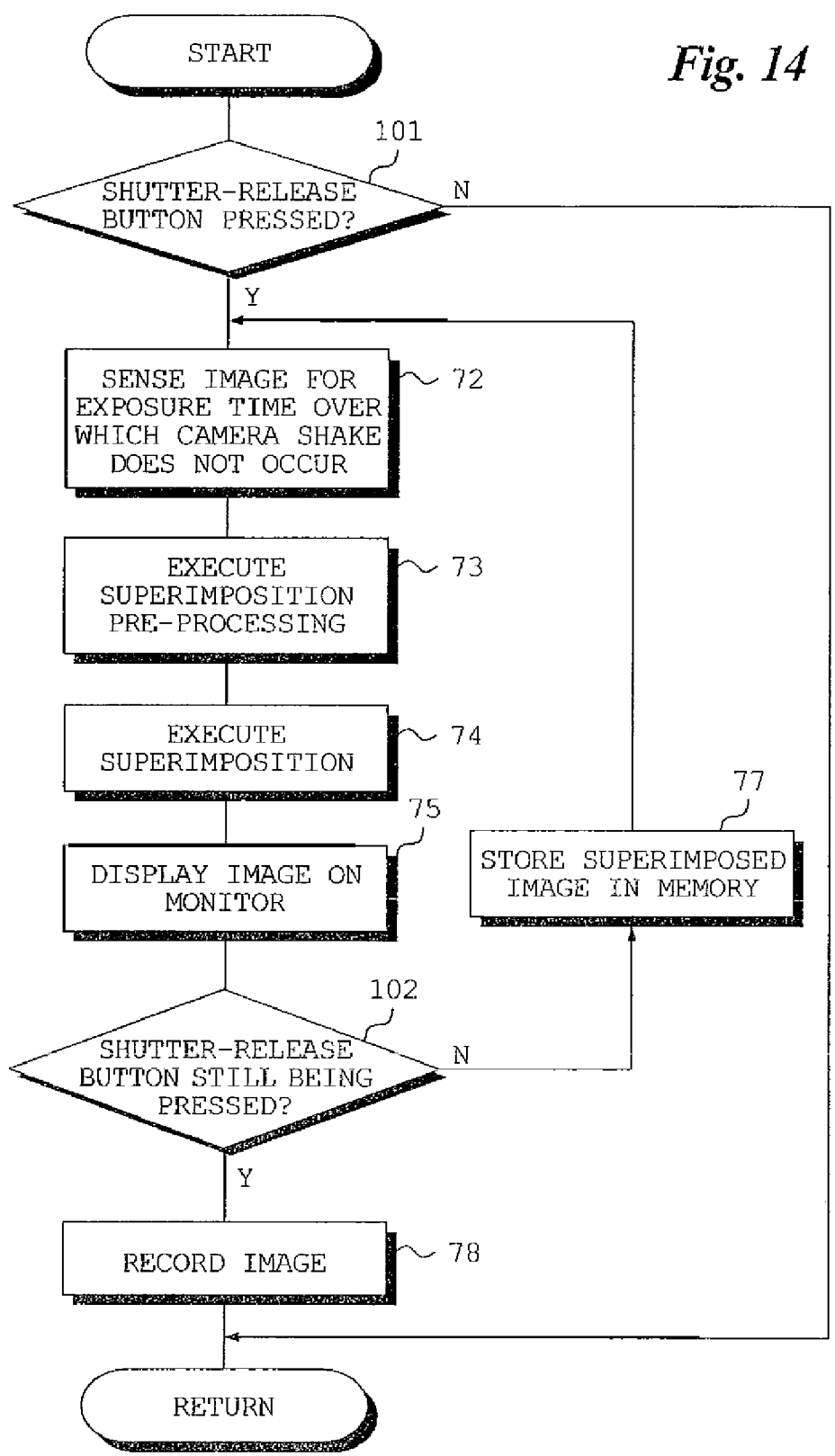
FIGS. 14 and 15 are flowcharts illustrating processing for generating a combined image.

FIG. 14, which illustrates a modification, is a flowchart showing processing corresponding to FIG. 12. Processing in FIG. 14 identical with that shown in FIG. 12 is identified by the same step numbers and need not be described again.

When the shutter-release button is pressed in the processing of FIG. 12, the above-described combining processing starts. The combining processing ends when the exposure-halt command is issued. By contrast, in the processing illustrated in FIG. 14, combining processing starts when the shutter-release button is pressed ("YES" at step 101), which is the same as the processing shown in FIG. 12, but monitoring is performed to determine whether the shutter-release button is continuing to be pressed. If the shutter-release button continues to be pressed ("YES" at step 102), then the above-described combining processing is repeated. If finger pressure is removed from the shutter-release button ("NO" at step 102), then combining processing ends and the image data that has been stored in memory temporarily is recorded on the memory card (step 78).

Figure 15:
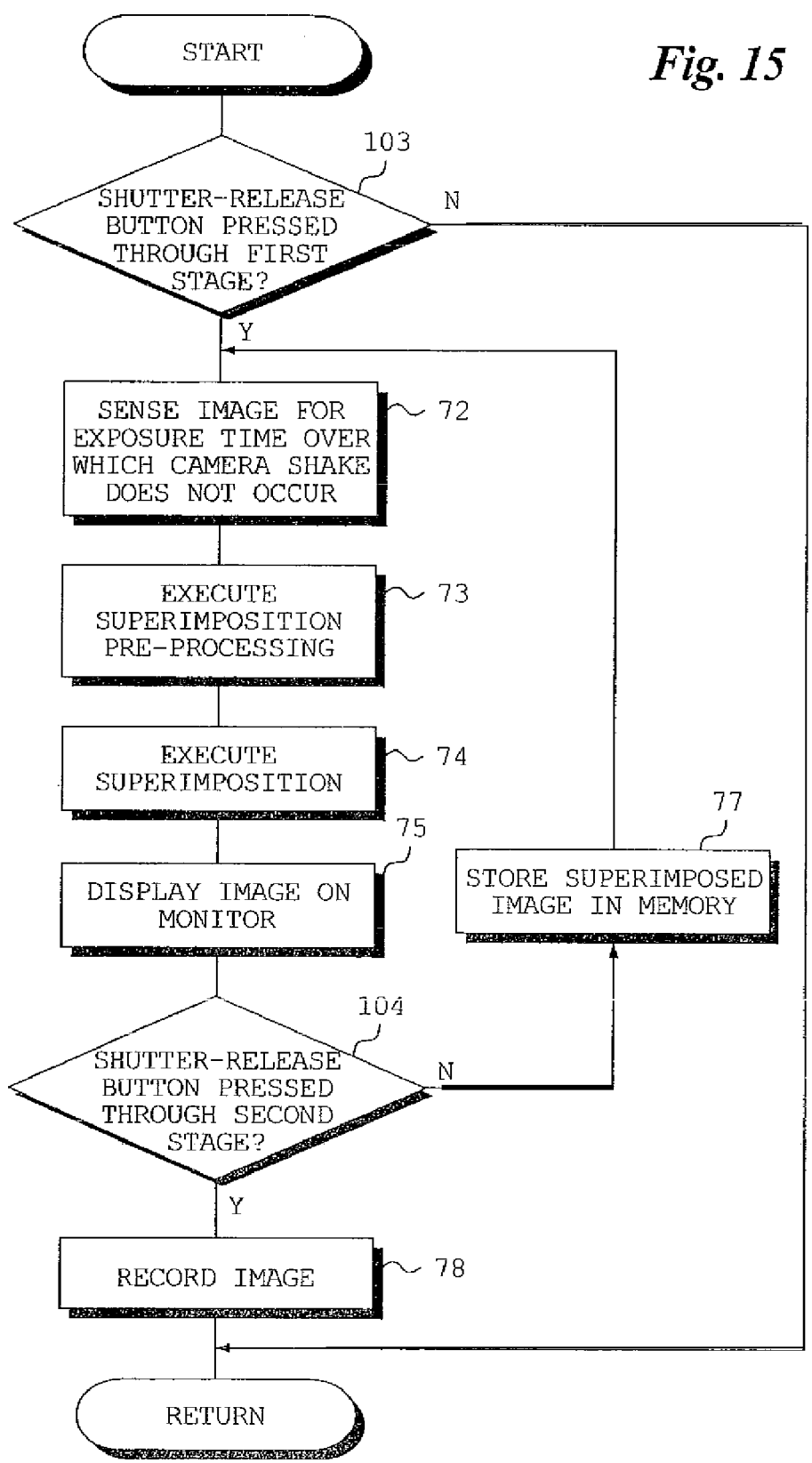

FIG. 15, which illustrates another modification, is a flowchart showing processing corresponding to FIG. 12. Processing in FIG. 15 identical with that shown in FIG. 12 is identified by the same step numbers and need not be described again.

In this embodiment, a shutter-release button of two-stage-stroke type is utilized. The above-described combining processing starts in response to pressing of the shutter-release button through the first stage of its stroke ("YES" at step 103). The above-described superimposition processing is repeated until the shutter-release button is pressed through the second stage of its stroke (step 104). If the shutter-release button is pressed through the second stage of its stroke ("YES" at step 104), combining processing ends and the image data that has been stored in memory temporarily is recorded on the memory card.

Figure 16:
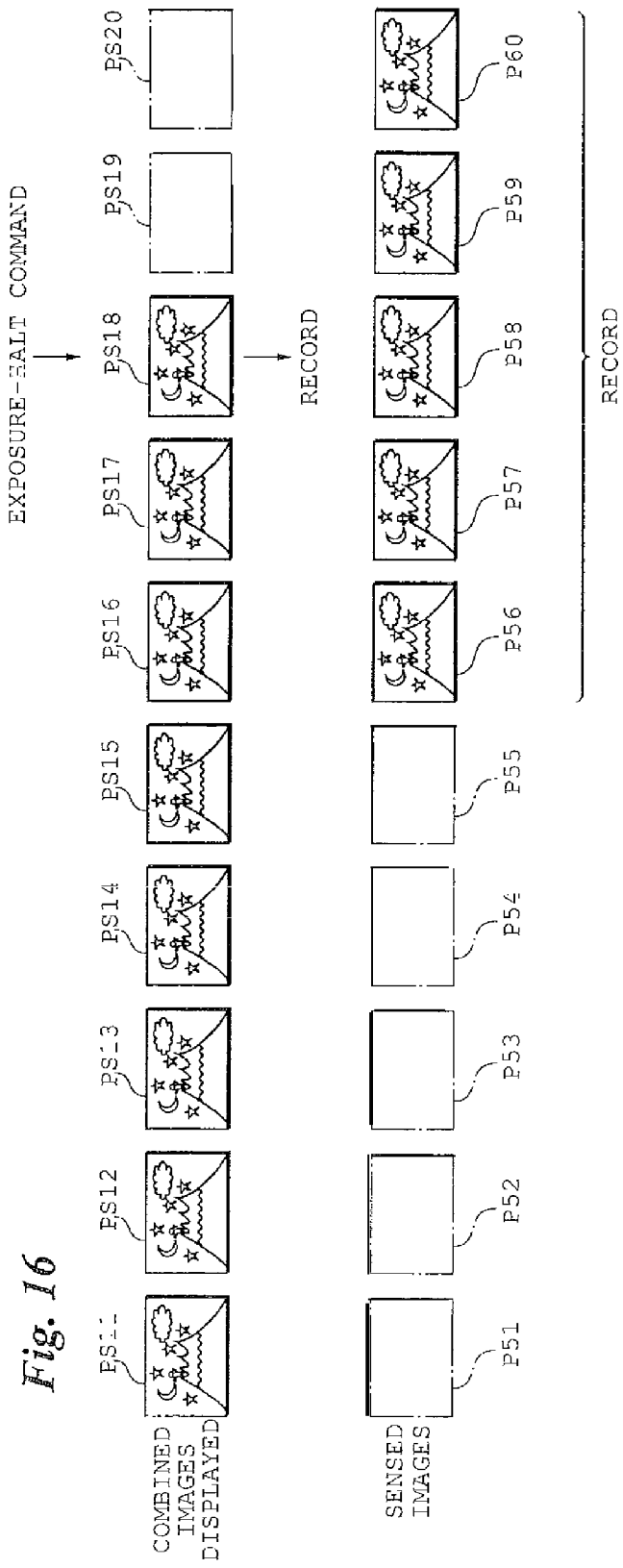
FIG. 16 illustrates combined images and sensed images.
Figure 17:
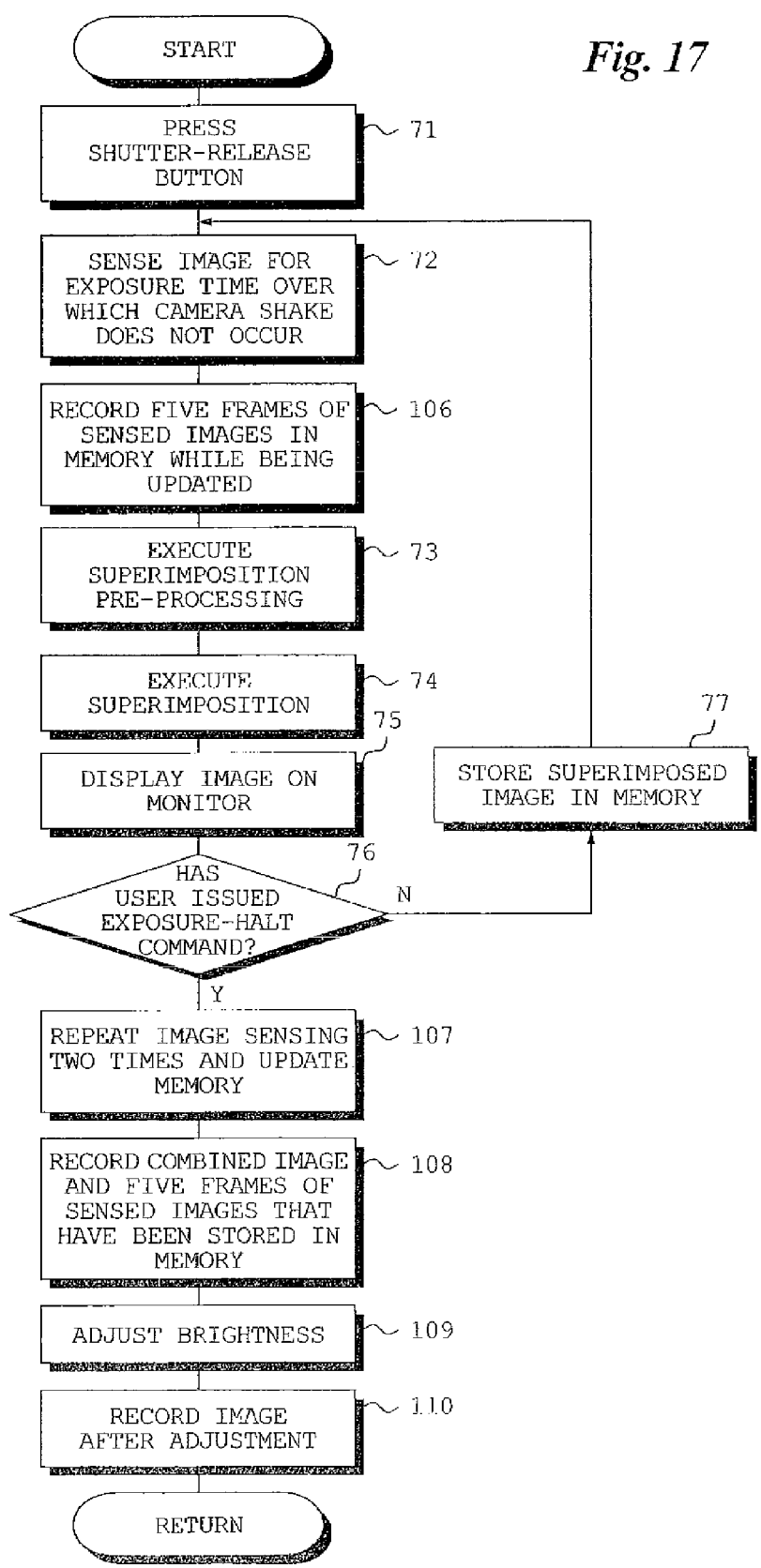
FIG. 17 is a flowchart illustrating processing for generating a combine image.
Figure 18:
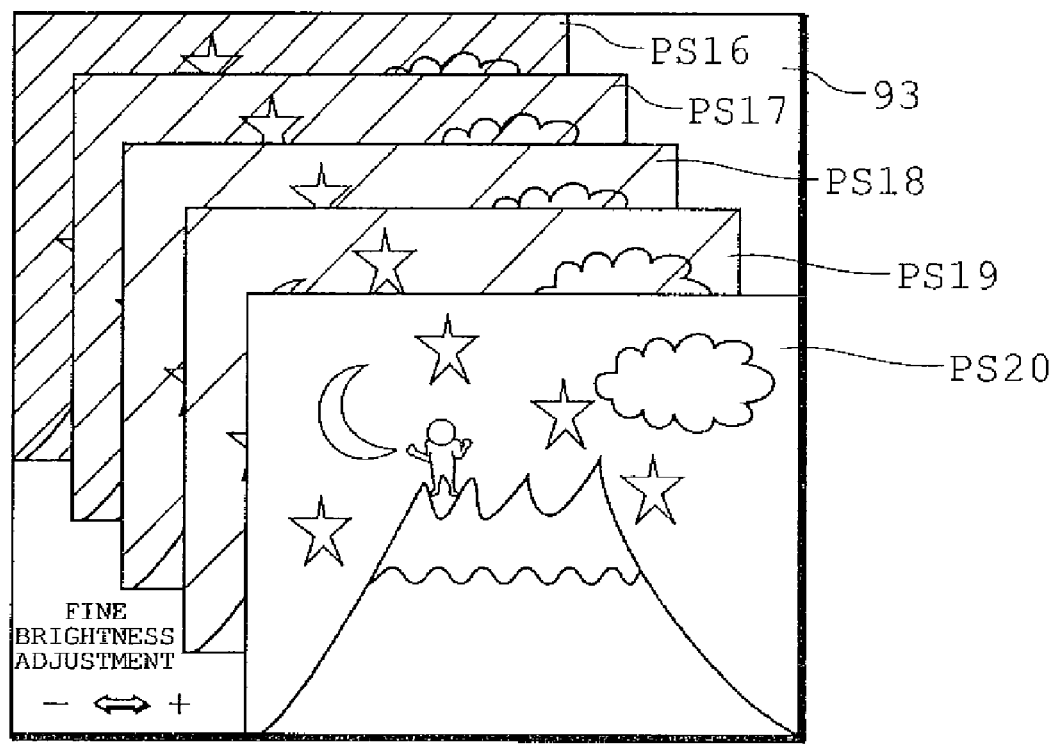
FIG. 18 illustrates an example of images displayed on a display screen.

FIGS. 16 to 18 illustrate a further modification. In this modification, five frames of images of the subject obtained by image sensing are recorded on the memory card, while one frame of the image of the subject obtained by image sensing is updated, in addition to image data representing the combined image.

FIG. 16 illustrates combined images and sensed images displayed on the display unit.

Combined images PS11 to PS20 are generated one after another in the manner described above. These combined images PS11 to PS20 are displayed on the display unit one after another. If the exposure-halt command is applied to the digital still camera when the combined image PS18 is displayed, for example, combining processing stops and the combined images PS19, P20, etc., are neither generated nor displayed.

The image of the subject is sensed one frame at a time and sensed images P51 to P60, etc., are obtained in order to generate combined images. In the foregoing embodiment, the sensed images P51 to P60 are used to generate combined images but are not recorded on the memory card. In the foregoing embodiment, image data representing a combined image is recorded on the memory card. By contrast, in this modification, image data representing five frames of sensed images bracketing the point in time at which the exposure-halt command is applied are recorded on the memory card in addition to the image data representing the combined image. For example, if the exposure-halt command is applied to the digital still camera when the combined image PS18 is displayed, the image of the subject is sensed after this as well and image data representing each of the sensed images P56 to P60 bracketing the point at which the combined image PS18 is obtained is recorded on the memory card besides the image data representing the combined image PS18. After these items of image data have been recorded on the memory card, the combined images PS16, PS17 obtained before the combined image PS18, or the combined images PS19, PS20 to be obtained, can be generated using the combined image PS18 and the sensed images P51 to P60.

FIG. 17 is a flowchart showing processing corresponding to FIG. 12. Processing in FIG. 17 identical with that shown in FIG. 12 is identified by the same step numbers and need not be described again.

The image of the subject is sensed for the length of exposure time over which camera shake is thought not to occur (step 72), as mentioned above, and image data representing the images of the subject obtained is recorded in memory temporarily, while being updated, in such a manner that five frames will be stored (step 106).

Even if the exposure-halt command is applied by the user ("YES" at step 76), image sensing is subsequently repeated two times and image data representing each of the two frames of sensed images obtained is stored in memory temporarily (step 107). The combined image and the five frames of sensed images that have been stored in memory temporarily are recorded on the memory card (step 108). When recording on the memory card ends, brightness adjustment processing is executed (step 109).

FIG. 18 illustrates an example of images displayed on a display screen 93 when brightness adjustment processing is executed.

The combined image PS18 prevailing when the exposure-halt command is applied and the combined images PS16 to PS20 generated from the sensed images P56 to P60 obtained by image sensing bracketing the combined image PS18 are displayed on the display screen 93 with a slight offset from one image to the next. Initially the images are positioned in such a manner that the darker combined images are displayed in back and the brighter combined images in front. Displayed at the lower left of the display screen 93 are characters reading "FINE BRIGHTNESS ADJUSTMENT" in order to notify the user of the fact that the brightness of the combined images can be finely adjusted. In addition, plus and minus symbols are displayed on respective sides of a double-arrow symbol.

If the left-arrow button 86 provided on the back of the digital still camera 80 is pressed, then a dark combined image is displayed in front whenever this button is pressed. If the right-arrow button 88 is pressed, then a bright combined image is displayed in front whenever the this button is pressed. If the decide button 87 is pressed, the image data representing the combined image that is being displayed is written over the combined image data that has already been recorded on the memory card (step 110 in FIG. 17). The image data representing each of the five frames of sensed images is erased from the memory card by completion of the brightness adjustment. It goes without saying, however, that this data need not necessarily be erased.

FIGS. 19A to 21 illustrate a further modification. This modification is such that when a combined image is displayed in the manner described above, a histogram of this combined image is displayed as well.

Figure 19A:
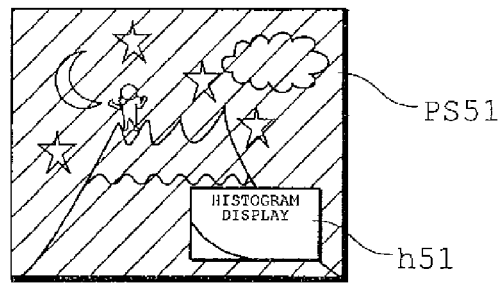
FIGS. 19A to 19E illustrate examples of images displayed on a display screen.
Figure 19B:
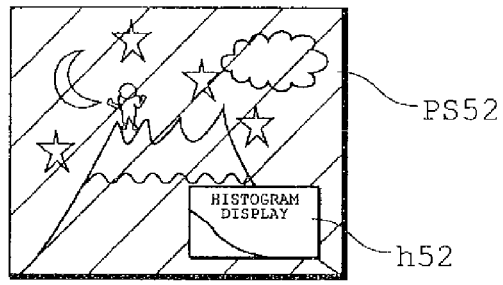
Figure 19C:
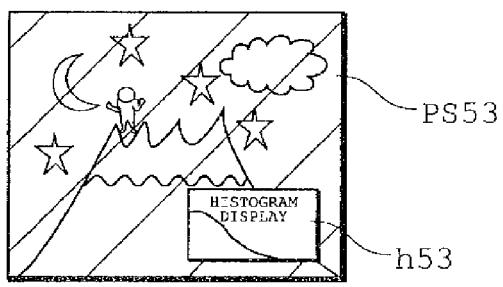
Figure 19D:
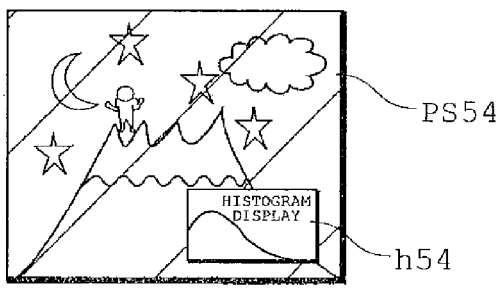
Figure 19E:
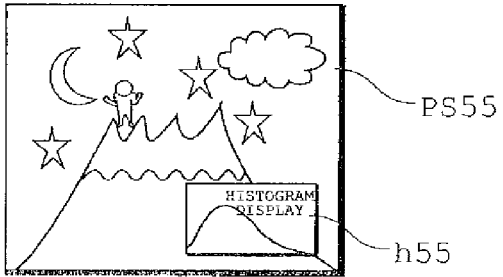

FIGS. 19A to 19E illustrate examples of images displayed on the display unit. With reference to FIG. 19A, a histogram h51 of a combined image PS51 is being displayed at the lower right of the combined image PS51 obtained in the manner set forth above. Similarly, with reference to FIGS. 19B to 19E, a histogram h52 of a combined image PS52 is displayed at the lower right of the combined image PS52, a histogram h53 of a combined image PS53 is displayed at the lower right of the combined image PS53, a histogram h54 of a combined image PS54 is displayed at the lower right of the combined image PS54, and a histogram h55 of a combined image PS55 is displayed at the lower right of the combined image PS55.

Figure 20:
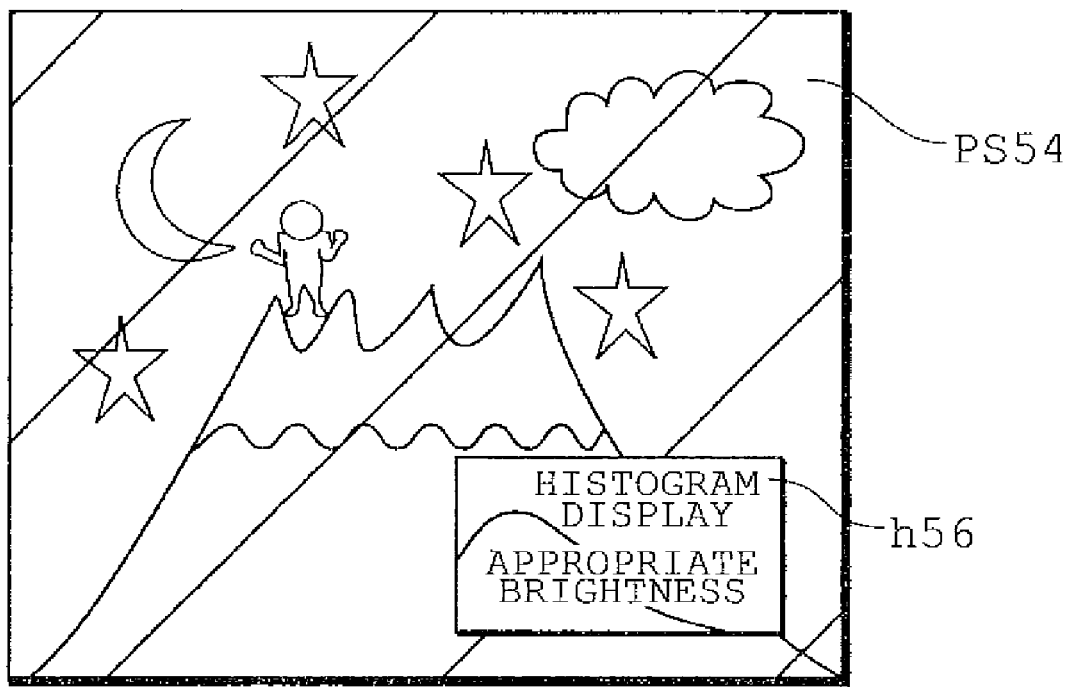
FIG. 20 illustrates an example of an image displayed on a display screen.

FIG. 20 illustrates an example of an image displayed on the display screen.

In the example shown in FIGS. 19A to 19E, the combined images and the histograms thereof are displayed. If brightness is appropriate, a message reading "APPROPRIATE BRIGHTNESS" is displayed on a histogram image h56. By observing this message, the user can determine that the combined image PS54 has the appropriate brightness.

Figure 21:
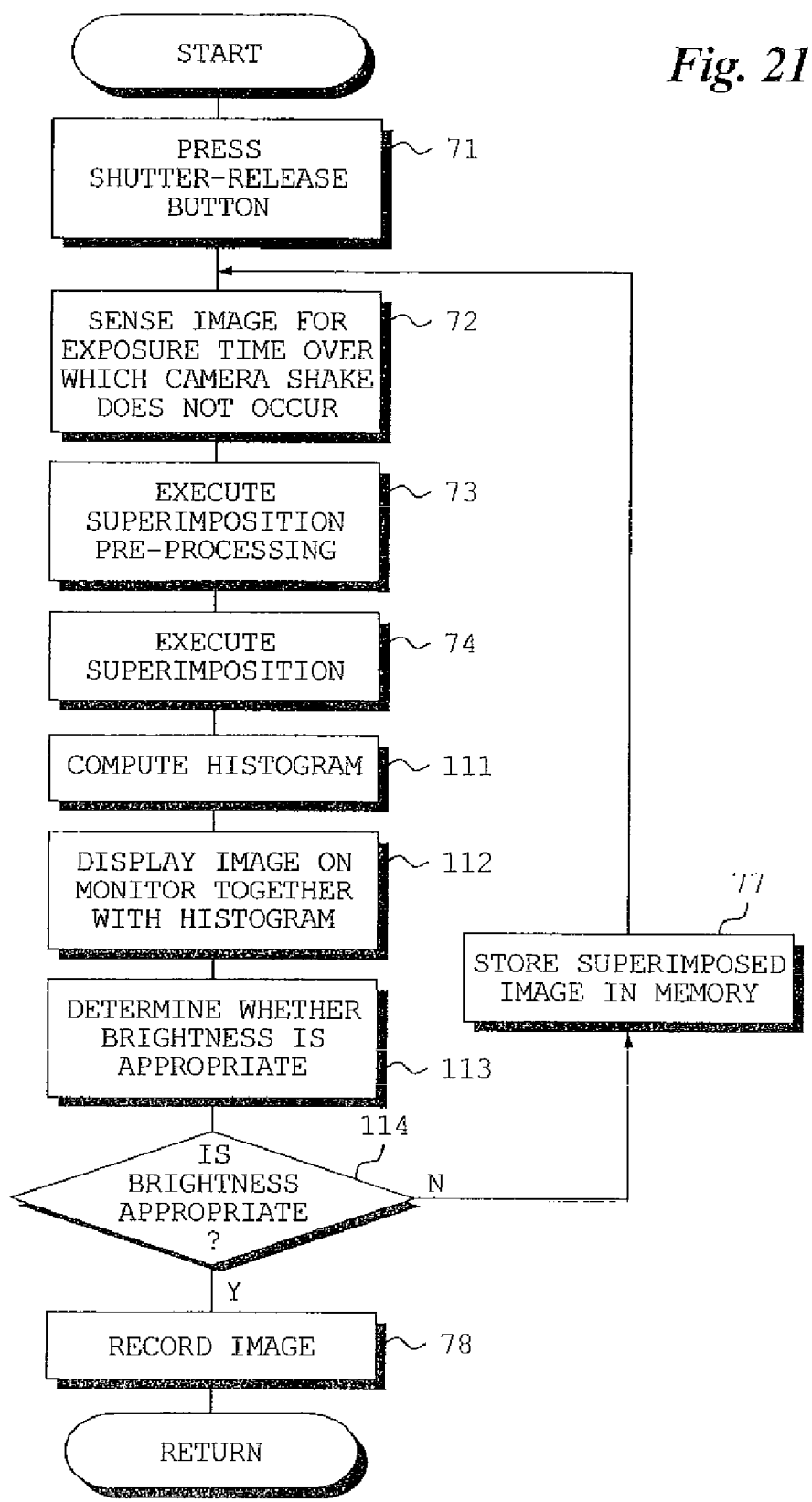
FIG. 21 is a flowchart illustrating processing for generating a combined image.

FIG. 21 is a flowchart illustrating processing corresponding to FIG. 12. Processing in FIG. 21 identical with that shown in FIG. 12 is identified by the same step numbers and need not be described again.

If superimposition processing is executed and a combined image is generated (step 74) in the manner described above, then a histogram of the generated combined image is computed (step 111). An image representing the generated histogram is displayed together with the combined image on the display unit (step 112). On the basis of the histogram generated, it is determined whether the combined image generated has the appropriate brightness (step 113). If the brightness is appropriate ("YES" at step 114), the image data representing the combined image having this appropriate brightness is recorded on the memory card (step 78). If the brightness is not appropriate ("NO" at step 114), then the image data representing the combined image is stored in memory temporarily (step 77) and imaging of the subject and generation of combined images continues. It goes without saying that in a case where the brightness is appropriate, the message "APPROPRIATE BRIGHTNESS" may be displayed, as mentioned above.

As many apparently widely different embodiments of the present invention can be made without departing from the spirit and scope thereof, it is to be understood that the invention is not limited to the specific embodiments thereof except as defined in the appended claims.

What is claimed is:

1. A digital still camera comprising:
   a solid-state electronic image sensing device for sensing the image of a subject repeatedly for an exposure time over which camera shake is thought not to occur, and repeatedly outputting image data representing the image of the subject;
   a combining device for generating one frame of a combined image obtained by combining the image of the subject represented by image data that has been output from said solid-state electronic image sensing device with the image of the subject represented by image data that was output from said solid-state electronic image sensing device by an immediately preceding image sensing operation, in such a manner that the images of the subject coincide;
   a combining control device for controlling said combining device so as to repeatedly execute processing for generating one frame of a combined image updated by combining the combined image, which is the result of combination by said combining device, with the image of the subject represented by image data that has been output from said solid-state electronic image sensing device, in such a manner that the images coincide; and
   a recording control device for recording, on a memory card in response to an exposure-halt command and on the basis of timing at which the exposure-halt command has been applied, image data representing the combined image updated in the processing in said combining device that is based upon said combining control device;
   wherein said solid-state electronic image sensing device senses a first plurality of frames of images of the subject after the exposure-halt command is applied;
   further comprising a temporary memory for temporarily storing the image data, which is repeatedly output from said solid-state electronic image sensing device, of a second plurality of frames of image data that is greater than the first plurality of frames, and said second plurality of frames further includes the first plurality of frames;
   wherein said recording control device records the second plurality of frames of image data, which has been stored in said temporary memory, on the memory card in addition to the image data representing the updated combined image.

2. The camera according to claim 1, wherein said recording control device records the second plurality of frames of image data, which has been stored in said temporary memory, on the memory card in addition to the image data representing the updated combined image.

3. The camera according to claim 2, wherein said display device displays a histogram of the displayed combined image in addition to the combined image.

4. The camera according to claim 1, further comprising:
   a determination device for determining whether the updated combined image has an appropriate brightness; and
   an alert device for notifying of appropriate brightness in response to a determination by said determination device that the updated combined image has an appropriate brightness.

5. The camera according to claim 1, further comprising a control device for controlling said solid-state electronic image sensing device so as to halt image sensing, in response to a determination by said determination device that the updated combined image has an appropriate brightness.

6. The camera according to claim 1, further comprising a shutter-release button;
   wherein said solid-state electronic image sensing device repeats sensing of the image of the subject while said shutter-release button is being pressed and halts image sensing in response to release of said shutter-release button.

7. The camera according to claim 1, wherein said shutter-release button is of the two-stage-stroke type; and
   said solid-state electronic image sensing device repeats sensing of the image of the subject in response to pressing of said shutter-release button through the first stage of its stroke, and halts sensing of the image of the subject in response to pressing of said shutter-release button through the second stage of its stroke.

8. The camera according to claim 1, wherein
   a second plurality of frames of image data bracketing the point in time at which the exposure-halt command is applied are recorded on the memory card.

9. A method of controlling a digital still camera, comprising:
   a step of a solid-state electronic image sensing device sensing the image of a subject repeatedly for an exposure time over which camera shake is thought not to occur, and repeatedly outputting image data representing the image of the subject;
   a step of a combining device generating one frame of a combined image obtained by combining the image of the subject represented by image data that has been output from the solid-state electronic image sensing device with the image of the subject represented by image data that was output from the solid-state electronic image sensing device by an immediately preceding image sensing operation, in such a manner that the images of the subject coincide;

a step of a combining control device controlling the combining device so as to repeatedly execute processing for generating one frame of a combined image updated by combining the combined image, which is the result of combination by the combining device, with the image of the subject represented by image data that has been output from the solid-state electronic image sensing device;

a step of a recording control device recording, on a memory card in response to an exposure-halt command and on the basis of timing at which the exposure-halt command has been applied, image data representing the combined image updated in the processing in the combining device that is based upon the combining control device;

a step of said solid-state electronic image sensing device sensing a first plurality of frames of images of the subject after the exposure-halt command is applied; and further comprising a step of temporary memory temporarily storing the image data, which is repeatedly output from said solid-state electronic image sensing device, of a second plurality of frames of image data that is greater than the first plurality of frames, and said second plurality of frames further includes the first plurality of frames;

wherein said recording control device records the second plurality of frames of image data, which has been stored in said temporary memory, on the memory card in addition to the image data representing the updated combined image.

* * * * *